(12) United States Patent
Madnani et al.

(10) Patent No.: US 8,533,408 B1
(45) Date of Patent: *Sep. 10, 2013

(54) CONSOLIDATING N-STORAGE ARRAYS INTO ONE STORAGE ARRAY USING VIRTUAL ARRAY NON-DISRUPTIVE DATA MIGRATION

(75) Inventors: Kiran Madnani, Framingham, MA (US); Jeffrey A. Brown, Shrewsbury, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/427,744

(22) Filed: Jun. 29, 2006

(51) Int. Cl.
*G06F 12/00* (2006.01)

(52) U.S. Cl.
USPC .......................................................... 711/162

(58) Field of Classification Search
None
See application file for complete search history.

(56) References Cited

U.S. PATENT DOCUMENTS

| | | | |
|---|---|---|---|
| 5,247,632 A | 9/1993 | Newman | |
| 5,568,629 A * | 10/1996 | Gentry et al. | 711/114 |
| 5,963,555 A | 10/1999 | Takase et al. | |
| 6,336,152 B1 | 1/2002 | Richman et al. | |
| 6,421,711 B1 | 7/2002 | Blumenau et al. | |
| 6,563,834 B1 | 5/2003 | Ogawa | |
| 6,684,209 B1 | 1/2004 | Ito et al. | |
| 6,839,750 B1 | 1/2005 | Bauer et al. | |
| 6,907,505 B2 * | 6/2005 | Cochran et al. | 711/162 |
| 6,944,785 B2 | 9/2005 | Gadir et al. | |
| 7,043,663 B1 | 5/2006 | Pittelkow et al. | |
| 7,051,101 B1 | 5/2006 | Dubrovsky et al. | |
| 7,120,728 B2 | 10/2006 | Krakirian et al. | |
| 7,124,143 B2 | 10/2006 | Matsunami et al. | |
| 7,260,737 B1 | 8/2007 | Lent et al. | |
| 7,318,120 B2 | 1/2008 | Rust et al. | |
| 7,340,639 B1 | 3/2008 | Lee et al. | |
| 7,366,846 B2 | 4/2008 | Boyd et al. | |

(Continued)

FOREIGN PATENT DOCUMENTS

| | | |
|---|---|---|
| EP | 1130514 A2 | 9/2001 |
| EP | 1357465 A | 10/2003 |
| WO | WO03062979 | 7/2003 |

OTHER PUBLICATIONS

Madnani; U.S. Appl. No. 11/318,757, filed Dec. 27, 2005; 35 pages.

(Continued)

*Primary Examiner* — Brian Peugh
(74) *Attorney, Agent, or Firm* — Guerin & Rodriguez, LLP; Michael A. Rodriguez

(57) ABSTRACT

Described are a system and method of migrating data stored in logical units of storage (LUNs) at a plurality of source storage arrays into one destination storage array transparently with respect to a host in communication with the source storage arrays through a switch. First and second source storage arrays and a destination storage array are each partitioned into a plurality of source virtual arrays. The destination virtual arrays include a first destination virtual array and a second destination virtual array. Data stored in a LUN of a first source virtual array of the first source storage array are copied to a corresponding LUN of the first destination virtual array of the destination storage array, and data stored in a LUN of a second source virtual array of the second source storage array are copied to a corresponding LUN of the second destination virtual array of the destination storage array.

19 Claims, 18 Drawing Sheets

(56) References Cited

U.S. PATENT DOCUMENTS

| | | | |
|---|---|---|---|
| 7,383,357 B2 | 6/2008 | Leichter et al. | |
| 7,398,421 B1 | 7/2008 | Limaye et al. | |
| 7,433,948 B2 | 10/2008 | Edsall et al. | |
| 7,500,134 B2 | 3/2009 | Madnani et al. | |
| 2002/0071386 A1 | 6/2002 | Gronke | |
| 2002/0165982 A1 | 11/2002 | Leichter et al. | |
| 2003/0018927 A1 | 1/2003 | Gadir et al. | |
| 2003/0131182 A1* | 7/2003 | Kumar et al. | 711/5 |
| 2004/0054866 A1 | 3/2004 | Blumenau et al. | |
| 2004/0133576 A1 | 7/2004 | Ito et al. | |
| 2004/0139240 A1 | 7/2004 | DiCorpo et al. | |
| 2004/0151188 A1 | 8/2004 | Maveli et al. | |
| 2004/0177228 A1* | 9/2004 | Leonhardt et al. | 711/170 |
| 2004/0213272 A1 | 10/2004 | Nishi et al. | |
| 2004/0243710 A1 | 12/2004 | Mao | |
| 2005/0008016 A1 | 1/2005 | Shimozono et al. | |
| 2005/0010688 A1 | 1/2005 | Murakami et al. | |
| 2005/0015415 A1 | 1/2005 | Garimella et al. | |
| 2005/0120160 A1 | 6/2005 | Plouffe | |
| 2005/0154849 A1 | 7/2005 | Watanabe | |
| 2005/0204104 A1* | 9/2005 | Aoshima et al. | 711/161 |
| 2005/0243611 A1 | 11/2005 | Lubbers et al. | |
| 2005/0251620 A1 | 11/2005 | Matsunami et al. | |
| 2006/0041595 A1 | 2/2006 | Taguchi et al. | |
| 2006/0047930 A1 | 3/2006 | Takahashi | |
| 2006/0064466 A1* | 3/2006 | Shiga et al. | 709/214 |
| 2006/0075005 A1 | 4/2006 | Kano et al. | |
| 2006/0080516 A1 | 4/2006 | Paveza et al. | |
| 2006/0107010 A1* | 5/2006 | Hirezaki et al. | 711/165 |
| 2006/0155777 A1 | 7/2006 | Shih et al. | |
| 2006/0190698 A1 | 8/2006 | Mizuno et al. | |
| 2007/0220310 A1 | 9/2007 | Sharma et al. | |
| 2007/0234342 A1 | 10/2007 | Flynn et al. | |
| 2007/0266212 A1 | 11/2007 | Uchikado et al. | |
| 2007/0291785 A1 | 12/2007 | Sharma et al. | |
| 2008/0005468 A1 | 1/2008 | Faibish et al. | |
| 2008/0086608 A1 | 4/2008 | Kano | |

OTHER PUBLICATIONS

Ofer; U.S. Appl. No. 11/318,719, filed Dec. 27, 2005; 73 pages.
Madnani; U.S. Appl. No. 11/318,675, filed Dec. 27, 2005; 90 pages.
Ofer.; U.S. Appl. No. 11/318,734, filed Dec. 27, 2005; 75 pages.
Brown, et al.; U.S. Appl. No. 11/427,646, filed Jun. 29, 2006; 47 pages.
Ofer, et al.; U.S. Appl. No. 11/427,759, filed Jun. 29, 2006; 76 pages.
Ofer, et al.; U.S. Appl. No. 11/427,724, filed Jun. 29, 2006; 78 pages.
Madnani, et al.; U.S. Appl. No. 11/427,731, filed Jun. 29, 2006; 82 pages.
Ofer, et al.; U.S. Appl. No. 11/427,749, filed Jun. 29, 2006; 76 pages.
Charles Millilgan et al., Online Storage Virtualization: The key to managing the data explosion, Proceedings of the 35th Hawaii International Conference on System Sciences, 2002, IEEE.
Office Action mailed Oct. 1, 2008 for U.S. Appl. No. 11/318,719.
Office Action mailed Sep. 22, 2008 for U.S. Appl. No. 11/318,734.
Office Action mailed Mar. 19, 2008 for U.S. Appl. No. 11/427,759.
Office Action mailed Dec. 9, 2008 for U.S. Appl. No. 11/427,724.
Office Action mailed Mar. 20, 2008 for U.S. Appl. No. 11/427,731.
Office Action mailed Mar. 18, 2008 for U.S. Appl. No. 11/427,749.
Final Office Action mailed Sep. 17, 2008 for U.S. Appl. No. 11/427,749.
Office Action mailed Sep. 3, 2008 for U.S. Appl. No. 11/427,646.
Office Action for U.S. Appl. No. 11/318,734 mailed Sep. 22, 2008 (44 pages).
Office Action for U.S. Appl. No. 11/318,719 mailed Sep. 17, 2008 (21 pages).
Office Action mailed Jul. 16, 2008 for U.S. Appl. No. 11/318,757.
Notice of Allowance mailed Jun. 12, 2008 for U.S. Appl. No. 11/318,675.
Office Action mailed Mar. 5, 2009 for U.S. Appl. No. 11/427,646.
Office Action mailed Mar. 17, 2009 for U.S. Appl. No. 11/427,759.
Office Action mailed Apr. 27, 2009 for U.S. Appl. No. 11/427,731.
Office Action mailed Apr. 27, 2009 for U.S. Appl. No. 11/427,749.
Office Action mailed May 7, 2009 for U.S. Appl. No. 11/318,734.
Office Action mailed May 11, 2009 for U.S. Appl. No. 11/318,719.
Office Action mailed Jun. 22, 2009 for U.S. Appl. No. 11/318,757.
Office Action mailed Jul. 20, 2009 for U.S. Appl. No. 11/427,724.
Office Action mailed Oct. 2, 2009 for U.S. Appl. No. 11/771,604.
Final Office Action mailed Oct. 21, 2009 for U.S. Appl. No. 11/318,734.
Final Office Action mailed Oct. 28, 2009 for U.S. Appl. No. 11/318,719.
Notice of Allowance mailed Dec. 3, 2009 for U.S. Appl. No. 11/318,719.
Notice of Allowance mailed Dec. 11, 2009 for U.S. Appl. No. 11/318,734.
Notice of Allowance mailed Nov. 16, 2009 for U.S. Appl. No. 11/427,646.
Final Office Action mailed Dec. 2, 2009 for U.S. Appl. No. 11/427,759.
Office Action mailed Nov. 27, 2009 for U.S. Appl. No. 11/771,686.
Final Office Action mailed Dec. 14, 2009 for U.S. Appl. No. 11/427,749.
Final Office Action mailed Dec. 29, 2009 for U.S. Appl. No. 11/427,731.
Final Office Action mailed Feb. 22, 2010 for U.S. Appl. No. 11/318,757.
Notice of Allowance mailed Mar. 6, 2010 for U.S. Appl. No. 11/427,724.
Office Action mailed Jul. 12, 2010 for U.S. Appl. No. 11/318,757.
Final Office Action mailed Jul. 2, 2010 for U.S. Appl. No. 11/771,604.
Final Office Action mailed Jun. 23, 2010 for U.S. Appl. No. 11/771,686.
Office Action mailed May 6, 2011 for U.S. Appl. No. 11/427,731, 23 pgs.
Office Action mailed Apr. 21, 2011 for U.S. Appl. No. 11/771,686, 23 pgs.
Office Action mailed Mar. 23, 2011 for U.S. Appl. No. 11/318,757, 14 pgs.
Office Action mailed Nov. 16, 2010 for U.S. Appl. No. 11/427,731.
Office Action mailed Dec. 16, 2010 for U.S. Appl. No. 11/427,749.
Office Action mailed Feb. 3, 2011 for U.S. Appl. No. 11/427,759.
Office Action mailed Nov. 26, 2012 for U.S. Appl. No. 11/427,731, 9 Pgs.
Office action mailed Aug. 15, 2012 for U.S. Appl. No. 11/771,604, 17 pgs.
Office action mailed Jul. 21, 2011 for U.S. Appl. No. 11/427,759, 15 pgs.
Office action mailed Sep. 21, 2011 for U.S. Appl. No. 11/427,749, 17pgs.
Notice of Allowance in related U.S. Appl. No. 11/427,749, mailed on Dec. 18, 2012; 5 pages.
Notice of Allowance in related U.S. Appl. No. 11/427,731, mailed on Apr. 12, 2013; 10 pages.
Notice of Allowance in related U.S. Appl. No. 11/427,744, mailed on Jul. 5, 2013; 20 pages.

* cited by examiner

| PORT NAME | PORT ID |
|---|---|
| apa | 0 |
| apb | 1 |
| | |
| | |

*FIG. 4*

| PORT NAME | PORT ID | VIRTUAL PORT NAME | VIRTUAL PORT ID |
|---|---|---|---|
| apa | 0 | vn0 | v0 |
| apa | 0 | vn1 | v1 |
| apa | 0 | vn2 | v2 |
| apb | 1 | vn3 | v3 |
| apb | 1 | vn4 | v4 |
| apb | 1 | vn5 | v5 |

| LUN NAME | PORT ID | LUN # |
|---|---|---|
| a0 | 0 | L00 |
| b0 | 0 | L01 |
| c0 | 0 | L02 |
| d0 | 0 | L10 |
| e0 | 0 | L11 |
| f0 | 0 | L12 |
| g0 | 0 | L20 |
| h0 | 0 | L21 |
| i0 | 0 | L22 |
| j0 | 0 | L30 |
| k0 | 0 | L31 |
| l0 | 0 | L32 |
| m0 | 0 | L40 |
| n0 | 0 | L41 |
| p0 | 0 | L42 |
| q0 | 0 | L50 |
| r0 | 0 | L51 |
| s0 | 0 | L52 |
| a1 | 1 | L60 |
| b1 | 1 | L61 |
| c1 | 1 | L62 |
| d1 | 1 | L70 |
| e1 | 1 | L71 |
| f1 | 1 | L72 |
| g1 | 1 | L80 |
| h1 | 1 | L81 |
| i1 | 1 | L82 |
| j1 | 1 | L90 |
| k1 | 1 | L91 |
| l1 | 1 | L92 |

| LUN NAME | VIRTUAL PORT ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |
| g0 | v1 | L20 |
| h0 | v1 | L21 |
| i0 | v1 | L22 |
| j0 | v1 | L30 |
| k0 | v1 | L31 |
| l0 | v1 | L32 |
| m0 | v2 | L40 |
| n0 | v2 | L41 |
| p0 | v2 | L42 |
| q0 | v2 | L50 |
| r0 | v2 | L51 |
| s0 | v2 | L52 |
| a1 | v3 | L60 |
| b1 | v3 | L61 |
| c1 | v3 | L62 |
| d1 | v3 | L70 |
| e1 | v3 | L71 |
| f1 | v3 | L72 |
| g1 | v4 | L80 |
| h1 | v4 | L81 |
| i1 | v4 | L82 |
| j1 | v4 | L90 |
| k1 | v4 | L91 |
| l1 | v4 | L92 |
| p0 | v5 | L42 |
| q0 | v5 | L50 |
| r0 | v5 | L51 |
| s0 | v5 | L52 |

(STEP 202) COPY DATA RESIDENT IN EACH SOURCE VIRTUAL ARRAY OF THE SOURCE STORAGE ARRAY TO A CORRESPONDING DESTINATION VIRTUAL ARRAY IN ONE OF THE MULTIPLE DESTINATION STORAGE ARRAYS

(STEP 204) TRANSFER METADATA FROM EACH SOURCE VIRTUAL ARRAY TO THE CORRESPONDING DESTINATION VIRTUAL ARRAY

(STEP 206) TRANSFER CONNECTION INFORMATION FROM EACH SOURCE VIRTUAL ARRAY TO THE CORRESPONDING DESTINATION VIRTUAL ARRAY

(STEP 208) TRANSFER MANAGEMENT INFORMATION FROM EACH SOURCE VIRTUAL ARRAY TO THE CORRESPONDING DESTINATION VIRTUAL ARRAY

(STEP 210) ACTIVATE SWITCHOVER

(STEP 212) COMMUNICATE W/ DNS OR W/ ARRAY NAME TABLE TO EXCHANGE UNIQUE IDENTIFIERS

(STEP 214) INDUCE NAME SERVER TO REINITIALIZE NAME SERVER DATABASE (E.G., WITH LINK BOUNCE)

(STEP 216) HOSTS ACQUIRE REINITIALIZED NAME SERVER DATABASE

(STEP 218) HOSTS QUERY ARRAYS FOR LUN IDS AND NUMBERS

ARRAY NAME TABLE (24) 100

| ARRAY S/N | ARRAY NAME |
|---|---|
| 123456A0 | SRC VARRAY A |
| 123456B1 | SRC VARRAY B |
| 123456C2 | SRC VARRAY C |
| 123456D3 | SRC VARRAY D |
| 123456E4 | SRC VARRAY E |
| 456789F5 | DEST A VARRAY F |
| 456789G6 | DEST A VARRAY G |
| 456789H7 | DEST A VARRAY H |
| 789876L8 | DEST B VARRAY L |
| 789876M9 | DEST B VARRAY M |
|  |  |

102, 104

DNS (106)

| ARRAY NAME | IP ADDRESS |
|---|---|
| SRC VARRAY A | 11.22.33.44 |
| SRC VARRAY B | 11.22.55.66 |
| SRC VARRAY C | 11.22.77.88 |
| SRC VARRAY D | 11.22.66.77 |
| SRC VARRAY E | 11.22.88.99 |
| DEST A VARRAY F | 12.23.34.45 |
| DEST A VARRAY G | 12.23.56.78 |
| DEST A VARRAY H | 12.23.89.90 |
| DEST B VARRAY L | 13.35.57.79 |
| DEST B VARRAY M | 13.35.68.80 |
|  |  |

ARRAY NAME TABLE (24) 100

| ARRAY S/N | ARRAY NAME |
|---|---|
| 123456A0 | DEST A VARRAY F |
| 123456B1 | DEST A VARRAY G |
| 123456C2 | DEST A VARRAY H |
| 123456D3 | DEST B VARRAY L |
| 123456E4 | DEST B VARRAY M |
|  |  |
|  |  |
|  |  |
|  |  |
|  |  |
|  |  |

102, 104

DNS (106)

| ARRAY NAME | IP ADDRESS |
|---|---|
|  |  |
|  |  |
|  |  |
|  |  |
|  |  |
| DEST A VARRAY F | 12.23.34.45 |
| DEST A VARRAY G | 12.23.56.78 |
| DEST A VARRAY H | 12.23.89.90 |
| DEST B VARRAY L | 13.35.57.79 |
| DEST B VARRAY M | 13.35.68.80 |
|  |  |

108, 110, 112

| ARRAY NAME TABLE (24) | |
|---|---|
| ARRAY S/N | ARRAY NAME |
| 123456A0 | SRC VARRAY A |
| 123456B1 | SRC VARRAY B |
| 123456C2 | SRC VARRAY C |
| 123456D3 | SRC VARRAY D |
| 123456E4 | SRC VARRAY E |
| | |
| | |
| | |
| | |
| | |
| 102 | 104 |

| DNS (106) | |
|---|---|
| ARRAY NAME | IP ADDRESS |
| SRC VARRAY A | 12.23.34.45 |
| SRC VARRAY B | 12.23.56.78 |
| SRC VARRAY C | 12.23.89.90 |
| SRC VARRAY D | 13.35.57.79 |
| SRC VARRAY E | 13.35.68.80 |
| | |
| | |
| | |
| | |
| | |
| 110 | 112 |

*FIG. 19*

ARRAY NAME TABLE (24)

| ARRAY S/N | ARRAY NAME |
|---|---|
| 123456A0 | SRC A VARRAY A |
| 123456B1 | SRC A VARRAY B |
| 123456C2 | SRC A VARRAY C |
| 456789D3 | SRC B VARRAY D |
| 456789E4 | SRC B VARRAY E |
| 789876F5 | DEST VARRAY F |
| 789876G6 | DEST VARRAY G |
| 789876H7 | DEST VARRAY H |
| 789876L8 | DEST VARRAY L |
| 789876M9 | DEST VARRAY M |

102 ↗  104 ↗

DNS (106)

| ARRAY NAME | IP ADDRESS |
|---|---|
| SRC A VARRAY A | 11.22.33.44 |
| SRC A VARRAY B | 11.22.55.66 |
| SRC A VARRAY C | 11.22.77.88 |
| SRC B VARRAY D | 11.22.66.77 |
| SRC B VARRAY E | 11.22.88.99 |
| DEST VARRAY F | 12.23.34.45 |
| DEST VARRAY G | 12.23.56.78 |
| DEST VARRAY H | 12.23.89.90 |
| DEST VARRAY L | 13.35.57.79 |
| DEST VARRAY M | 13.35.68.80 |

ARRAY NAME TABLE (24)

| ARRAY S/N | ARRAY NAME |
|---|---|
| 123456A0 | DEST VARRAY F |
| 123456B1 | DEST VARRAY G |
| 123456C2 | DEST VARRAY H |
| 456789D3 | DEST VARRAY L |
| 456789E4 | DEST VARRAY M |

102 ↗  104 ↗

DNS (106)

| ARRAY NAME | IP ADDRESS |
|---|---|
| DEST VARRAY F | 12.23.34.45 |
| DEST VARRAY G | 12.23.56.78 |
| DEST VARRAY H | 12.23.89.90 |
| DEST VARRAY L | 13.35.57.79 |
| DEST VARRAY M | 13.35.68.80 |

| ARRAY NAME TABLE (24) | |
|---|---|
| ARRAY S/N | ARRAY NAME |
| 123456A0 | SRC A VARRAY A |
| 123456B1 | SRC A VARRAY B |
| 123456C2 | SRC A VARRAY C |
| 456789D3 | SRC B VARRAY D |
| 456789E4 | SRC B VARRAY E |
| | |
| | |
| | |
| | |
| | |
| 102 | 104 |

| DNS (106) | |
|---|---|
| ARRAY NAME | IP ADDRESS |
| SRC A VARRAY A | 12.23.34.45 |
| SRC A VARRAY B | 12.23.56.78 |
| SRC A VARRAY C | 12.23.89.90 |
| SRC B VARRAY D | 13.35.57.79 |
| SRC B VARRAY E | 13.35.68.80 |
| | |
| | |
| | |
| | |
| | |
| 110 | 112 |

FIG. 24

CONSOLIDATING N-STORAGE ARRAYS INTO ONE STORAGE ARRAY USING VIRTUAL ARRAY NON-DISRUPTIVE DATA MIGRATION

RELATED APPLICATIONS

This patent application is related to the following commonly owned United States patent applications: "Presentation of Virtual Arrays Using N-Port ID Virtualization," application Ser. No. 11/318,757, filed Dec. 27, 2005; "On-line Data Migration of a Logical/Virtual Storage Array," application Ser. No. 11/318,719, filed Dec. 27, 2005 now U.S. Pat. No. 7,697,515; and "On-Line Data Migration of a Logical/Virtual Storage Array By Replacing Virtual Names," application Ser. No. 11/318,734, filed Dec. 27, 2005 now U.S. Pat. No. 7,697,554; the entireties of which applications are incorporated by reference herein.

FIELD OF THE INVENTION

The present invention relates generally to storage systems. More particularly, the invention relates to consolidating multiple storage arrays into a single storage array using virtual array migration.

BACKGROUND

Today's enterprise data centers store ever-larger amounts of business critical data that must be immediately and continuously available. Ever larger and more complex storage systems are used for storage of the data. Many different hosts and applications access data on these storage systems. To provide security and prevent data corruption, it is often necessary to ensure that the applications and hosts have exclusive access to particular areas of storage in the system.

One mechanism for partitioning storage systems employs the concept of "virtual arrays". Accordingly, software is provided within a storage array to partition the array logically into separate storage groups. A prior art "storage group" includes at least one host and a set of logical units of storage. The logical units of storage in the group are accessible only to the hosts in the storage group. Other hosts cannot access a storage group to which they have not been granted access. Current methods for partitioning storage arrays into virtual arrays, however, can be highly complex and expensive, and operate only at the storage array level. It is desirable to provide a simpler, inexpensive means of presenting virtual arrays to host systems, and to provide a mechanism for centralizing virtual array partitioning from another part of the system, for example, the switch fabric. It is also desirable to be able to migrate data between virtual arrays.

SUMMARY

In one aspect, the invention features a method of migrating data stored in logical units of storage (LUNs) at a plurality of source storage arrays into one destination storage array transparently with respect to a host in communication with the source storage arrays through a switch. A first source storage array is divided into a plurality of source virtual arrays, a second source storage array is divided into a plurality of source virtual arrays, and the destination storage array is divided into a plurality of destination virtual arrays including a first destination virtual array and a second destination virtual array. Data stored in a LUN of a first source virtual array of the first source storage array are copied to a corresponding LUN of the first destination virtual array of the destination storage array, and data stored in a LUN of a second source virtual array of the second source storage array are copied to a corresponding LUN of the second destination virtual array of the destination storage array.

In another aspect, the invention features a storage network comprising a switch and a destination storage array coupled to the switch. The destination storage array is partitioned into a plurality of destination virtual arrays including a first destination virtual array and a second destination virtual array. The storage network also includes first and second source storage arrays coupled to the switch. The first source storage array is divided into at least one source virtual array including a first source virtual array. The first source virtual array has a logical unit of storage (LUN) for storing data and a replication engine that copies the data stored on the LUN of the first source virtual array to a corresponding LUN of the first destination virtual array during a data migration event. The second source storage array is divided into at least one source virtual array including a second source virtual array. The second source virtual array has a LUN for storing data and a replication engine that copies the data stored on the LUN of the second source virtual array to a corresponding LUN of the second destination virtual array during the data migration event.

In still another aspect, the invention features a method of migrating data stored in logical units of storage (LUNs) at a plurality of source storage arrays into one destination storage array transparently with respect to a host in communication with the source storage arrays through a switch. A first source storage array is divided into a plurality of source virtual arrays, a second source storage array is divided into a plurality of source virtual arrays, and the destination storage array is divided into a plurality of destination virtual arrays including a first destination virtual array and a second destination virtual array.

Data stored in a LUN of a first source virtual array of the first source storage array are copied to a corresponding LUN of the first destination virtual array of the destination storage array and data stored in a LUN of a second source virtual array of the second source storage array are copied to a corresponding LUN of the second destination virtual array of the destination storage array.

During a data migration event, connection information, management information, and metadata associated with the first source virtual array are transferred from the first source storage array to the destination storage array where said connection information, management information, and metadata become associated with the first destination virtual array of the destination storage array. Also, connection information, management information, and metadata associated with the second source virtual array of the second source storage array are transferred to the destination storage array where said connection information, management information, and metadata become associated with the second destination virtual array of the destination storage array.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is an exemplary representation of a name server table resident in the switch fabric.

FIG. 5 is an exemplary representation of a LUN table used by hosts to map LUN numbers to port IDs and LUN names

FIG. 7 is an exemplary representation of a name server table resident in the switch fabric used to map port names and IDs to virtual port names and virtual port IDs.

FIG. 8 is an exemplary representation of a LUN table used by hosts to map LUN names to virtual port IDs and LUN numbers FIG. 9 are exemplary representations of an array name table used by a host to map serial numbers to array names and of a DNS table used to resolve array names to IP addresses.

FIG. 16 is a flow diagram of an embodiment of process for partitioning data at a single source storage array into multiple destination storage arrays using virtual array migration.

FIG. 17 are exemplary representations of an array name table used by a host to map serial numbers to storage array names and of a DNS table used to resolve storage array names to IP addresses before the array partitioning of FIG. 15 and FIG. 16.

FIG. 18 is a first exemplary representation of the array name and DNS tables of FIG. 17 after completion of the array partitioning.

FIG. 19 is a second exemplary representation of the array name and DNS tables of FIG. 17 after completion of the array partitioning.

FIG. 22 are exemplary representations of an array name table used by a host to map serial numbers to storage array names and of a DNS table used to resolve storage array names to IP addresses before the array consolidation of FIG. 20 and FIG. 21.

FIG. 23 is a first exemplary representation of the array name and DNS tables of FIG. 22 after completion of the array consolidation.

FIG. 24 is a second exemplary representation of the array name and DNS tables of FIG. 22 after completion of the array consolidation.

DETAILED DESCRIPTION

Figure 1:
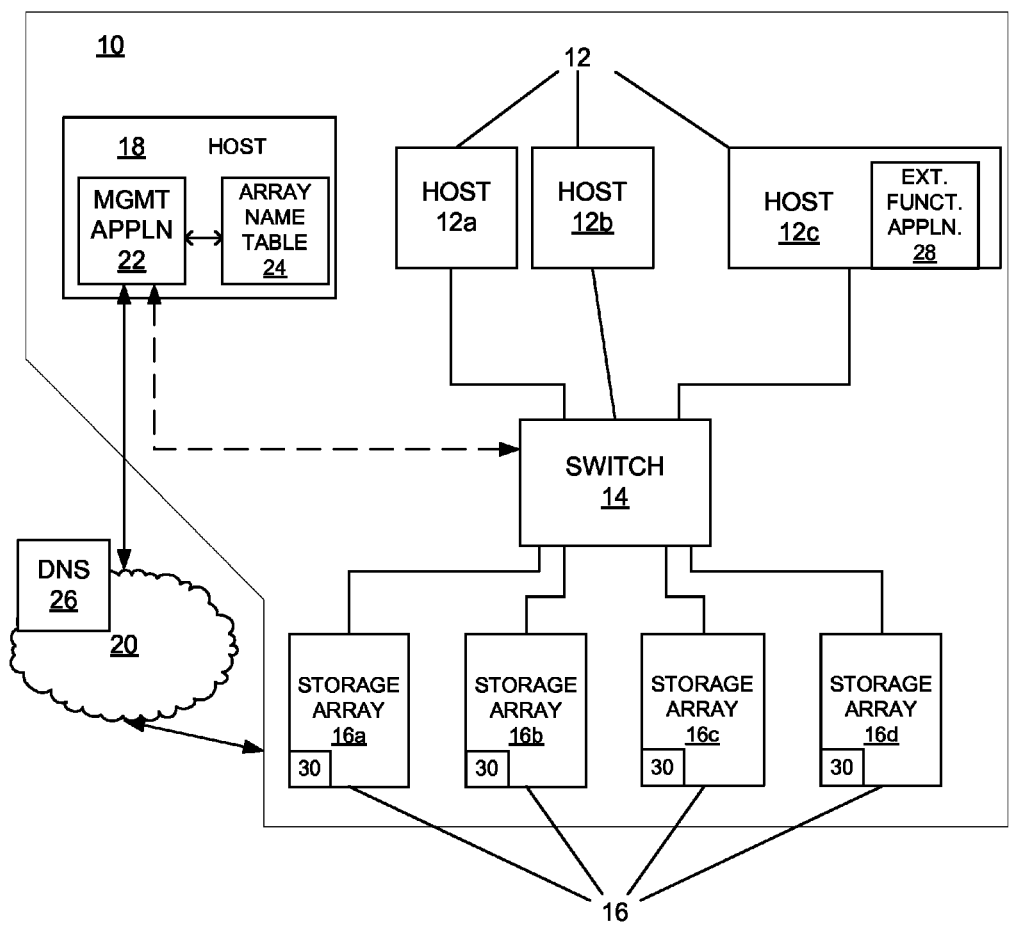
FIG. 1 is a functional block diagram of an embodiment of a storage area network (SAN) in communication with a plurality of hosts including a management station, the SAN including multiple storage arrays coupled to the hosts through a switch fabric and to the management station through a network.

Storage networks embodying the invention include storage arrays that are partitioned into virtual arrays. During data migration events, as described herein, data are migrated from one or more source virtual arrays to one or more destination virtual arrays. The migration of the data occurs transparently with respect to the hosts and host applications that may be communicating with the virtual arrays. To achieve this transparency, the source and destination virtual arrays exchange connection information (i.e., the names of their virtual array ports and of their logical units or LUNs). The exchange of the connection information causes the hosts to communicate with the destination virtual array instead of with the source virtual array. This enables host communication with the migrated LUNs to continue uninterrupted, thereby eliminating application downtime for an array upgrade or replacement.

In accordance with one embodiment, each virtual array presents its own virtual array management interface (i.e., for control plane functionality) to hosts. Management applications running on the hosts use the management interfaces to communicate directly and independently with each virtual array for managing that virtual array and its associated LUNs. Examples of information provided by the management interfaces include IP addresses, logical serial numbers, virtual array names, and gatekeepers.

In accordance with another embodiment, the source and destination virtual arrays also exchange virtual array management interfaces during a data migration event. The exchange of management interfaces makes the migration of data and connection information transparent to management applications executing on the hosts. That is, management applications can continue to communicate with the virtual arrays, unaffected or uninterrupted by the data and connection migration, in effect, unaware of the transfer of data from one virtual array to another virtual array. Consequently, data migration events require no modification to many of the commercially available management applications used by administrators to manage their storage networks.

In addition to the migration of data from a source virtual array to a destination virtual array, another embodiment migrates metadata. This metadata are associated with applications that extend storage functionality, examples of which are data back-up applications. In general, the metadata represents information critical to the proper operation of the extended storage functionality application. If a data migration event occurs during execution of an extended storage functionality application, then migration of the metadata to the destination virtual array ensures that the extended storage functionality application can continue to operate properly after the data migration event.

Storage networks constructed in accordance with other embodiments of the invention use virtual array migration to migrate data from a single source storage array to a plurality of destination storage arrays in a process referred to as array partitioning. Other embodiments of storage networks use virtual array migration to migrate data from a plurality of source storage arrays to a single destination storage array in a process referred to as array consolidation.

For array partitioning and array consolidation, each source and destination storage array is organized into virtual arrays. For array partitioning, the data, connections, and management interfaces of the source virtual arrays (of a single source storage array) are migrated to the virtual arrays of multiple destination storage arrays. For array consolidation, the data, connections, and management interface of at least one source virtual array from each one of multiple source storage arrays are migrated to the virtual arrays of a single destination storage array. The array partitioning and array consolidation processes can also include the transfer of extended storage functionality metadata between source and destination virtual arrays.

FIG. 1 shows an exemplary storage area network (SAN) 10 in which the invention can be implemented. The SAN 10 employs a Fibre Channel fabric topology. Fibre Channel is a high-speed serial transport used in storage systems. The transport is described in a series of standards that can be found at X3T9.3 *Task Group of ANSI: Fibre Channel Physical and Signaling Interface (FC-PH)*, Rev. 4.2 Oct. 8, 1993. Hosts 12, shown individually as host 12a, host 12b, and host 12c, are coupled to a Fibre Channel "fabric" in the storage system, herein shown as a switch 14. Storage arrays 16, shown individually as 16a, 16b, 16c, and 16d, are also coupled to the switch 14. The hosts 12 communicate with disks or disk drives 58 (FIG. 2) of any of the storage arrays 16 using a cross-point Fibre Channel connection through the switch 14. Each storage array 16 is partitioned into one or more virtual arrays (FIG. 2) and has a virtual array management interface—i.e., management information by which a remotely executing management application may identify a virtual array and its devices (e.g., logical units or LUNs) and send management messages or packets specifically to the virtual array. The virtual arrays can export their array management interfaces through an application program interface (API). Through use of this management API, management applications can manage and control the virtual arrays and their devices (e.g., LUNs).

In one embodiment, the virtual array management interface of each virtual array includes such management information as a logical serial number, an array name, a network address (e.g., IP address), a gatekeeper (for some types of storage arrays, e.g., EMC Corporation's Symmetrix™), and alphanumeric identifiers for the LUNs of that storage array. A gatekeeper, as used herein, is a small LUN that maintains data about the LUNs of the associated virtual array. Management applications can communicate with the gatekeeper, for example, to discover the LUNs on the virtual array.

Another host 18, referred to as a management station, is also in communication with the storage arrays 16 over a network 20. Executing at the management station 18 is a management application 22 used by a storage network administrator to manage (i.e., discover, access, configure, and monitor) the virtual arrays and their LUNs. Examples of management applications that may be used in the practice of the invention include, but are not limited to, NAVISPHERE® Management Suite and EMC Control Center (ECC)®/Open Edition, each produced by EMC Corporation of Hopkinton, Mass.

Communication between the management host 18 and the storage arrays 16 can transpire in accordance with any transport protocol. For example, the host 18 and storage arrays 16 can communicate over the IP network 20 according to the TCP/IP and HTTP protocols. As another example, the host 18 and storage arrays 16 can communicate through the Fibre Channel switch 14 using the Fibre Channel protocol. For facilitating communication, an array name table 24 maintains associations of array serial numbers with array names. In addition, a Domain Name Server (DNS) 26 maintains associations of storage array names with network IP addresses. As described below, the array names in the array name table 24 and at the DNS 26 correspond to virtual array names (i.e., those array names given to virtual arrays of the storage arrays 16). For purposes of illustration, the management station 18 maintains the array name table 24, and the DNS server 26 resides on the network 20.

In FIG. 1, the host 12c has a host application 28 referred to generally as an extended storage functionality application. In general, the host application 28 includes program code for providing particular storage functionality on the data stored in the disks 58 at a storage array. The storage arrays have program code 30 that cooperates with the host application 28 to achieve the storage functionality. This program code 30 at the storage array maintains, updates, and uses metadata throughout its execution to accomplish the designed functionality of the host application 28.

As an example of an extended storage functionality application, a data back-up program copies the data contents of a production device to a backup device located in the same storage array. The copy is a snapshot in time of the data of the production device. To accomplish this designed functionality, the backup program maintains certain types of metadata, e.g., information that tracks which logical blocks of a device have been copied to the backup device, and changes (i.e., deltas) to the contents of the production device that have occurred since the backup program started executing. An example of data back-up program that may be adapted to practice the invention is SnapView™, produced by EMC Corporation of Hopkinton, Mass. The principles of the invention apply to various types of extended storage functionality applications, provided such applications produce and maintain metadata. Different extended storage functionality applications typically employ different types of metadata, and any type of metadata may be migrated from one virtual array to another virtual array, as described herein.

Figure 2:
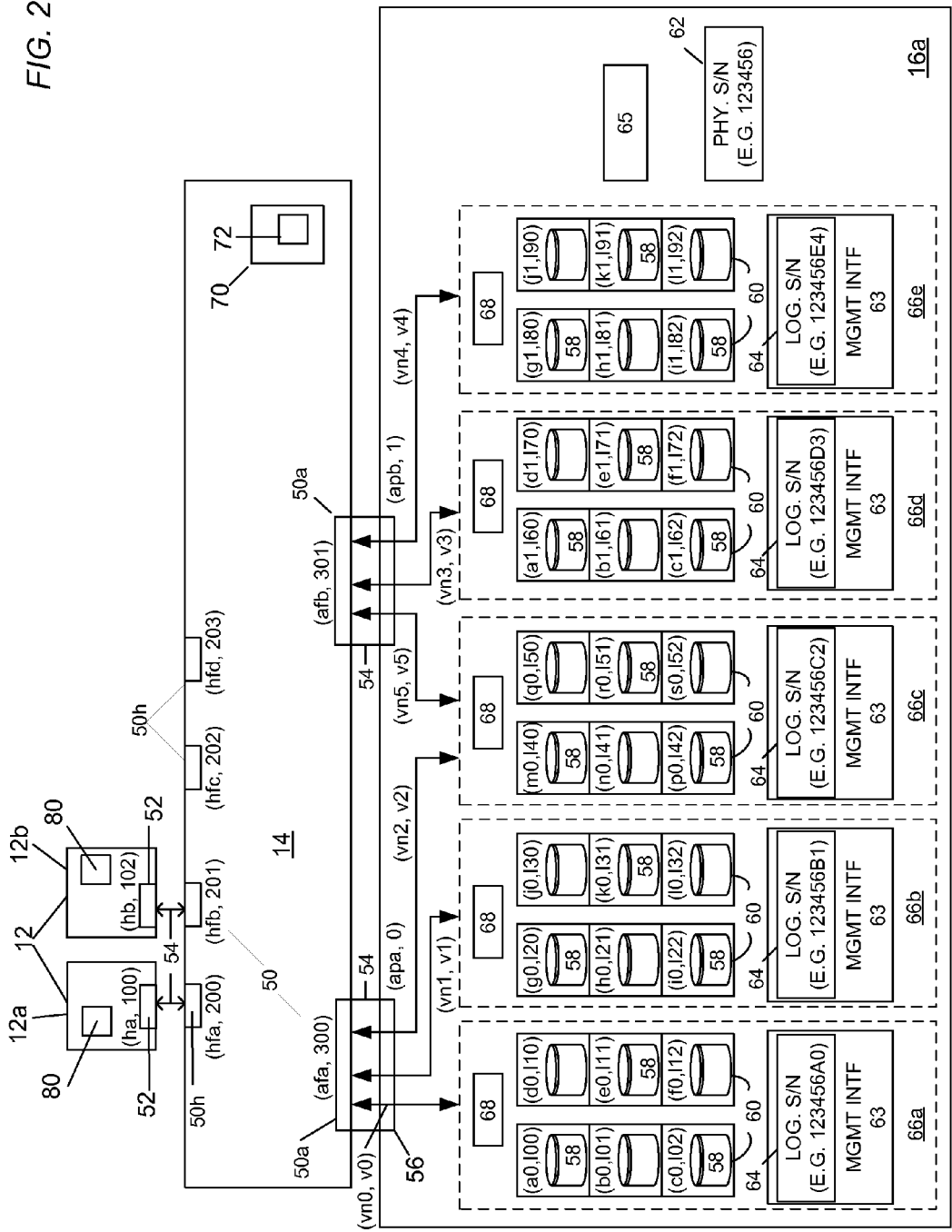
FIG. 2 is a representation of an embodiment of a SAN, wherein the logical units (LUNs) of storage in a storage array are arranged into storage groups (i.e., virtual arrays) and are separately addressable through virtual port identifiers (IDs).

FIG. 2 shows the hosts 12a, 12b, the storage array 16a, and the switch 14 in more detail. Storage array 16a is a representative example of the storage arrays 16, although each of the storage arrays can have fewer or more ports and LUNs than those shown for storage array 16a. The switch 14 includes switch ports 50. As used herein, switch ports 50 that are coupled to a host are referred to as host-facing ports, and those that are coupled to a storage array are referred to as array-facing ports. Of the switch ports 50, host-facing switch ports are labeled as 50h, array-facing switch ports are labeled as 50a. Host ports 52 on the hosts 12 are coupled by Fibre Channel links 54 to host-facing switch ports 50h on the switch 14. Physical array ports 56 on the array 16a are coupled by Fibre Channel links 54 to array-facing switch ports 50a on the switch 14.

The storage array 16a includes an array of disks 58 and a controller 65. The disks 58 are organized into logical units (LUNs) 60, originally a SCSI (small computer system interface) term, now commonly used to describe a logical unit of physical storage space. The storage array 16a exports the LUNs 60 over the Fibre Channel links 54 through the switch 14, for access by the hosts 12. As herein shown, each disk 58 is configured as a separate LUN 60, though it is understood that a LUN can encompass part of a disk, or parts of multiple disks, or multiple complete disks. The arrangement shown is chosen for convenience of description.

In a Fibre Channel system, such as that of FIG. 2, each Fibre Channel device (including, but not limited to, host ports, array ports, and LUNs) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID". The Fibre Channel address is dynamic and dependent upon the configuration of the system. The IDs are used for directing information between the hosts 12 and the storage arrays 16 and LUNs 60 in the system. Port addresses are referred to as "port IDs". After initialization, the hosts 12 communicate with the storage arrays 16 and LUNs 60 by sending messages to the appropriate array port and LUN addresses. The hosts 12 adapt to new port and LUN addresses, but each device in use maintains its same name in order for uninterrupted communications to continue.

In a Fabric topology, the switch 14 assigns IDs to the host ports 52 and array ports 56 during initialization. IDs, as described in the Fibre Channel specification, are 24-bit quantities containing several fields. For purposes of this description, it is sufficient to understand that the ID assigned to an array port 56 is a derivative of the switch name and the ID of the switch port 50. Thus, the name of an array port 56 depends on the switch port 50 to which the array port 56 is coupled.

Throughout this description, names and IDs are shown symbolically with alphanumeric symbols for simplicity of explanation. In FIG. 2, the names and IDs of each port and LUN are shown as a pair (name, ID). The host ports 52 for hosts 12a, 12b are shown to have name-ID pairs of (ha, 100) and (hb, 102), respectively. The name-ID pairs of the host-facing switch ports 50h are shown as (hfa, 200), (hfb, 201), (hfc, 202), and (hfd, 203). The host-facing port (hfa, 200) is coupled to the host port (ha, 100) on the host 12a and the host-facing port (hpb, 201) is coupled to the host port (hb, 102), on the host 12b.

Each array-facing switch port 50 and each array port 56 have a name and ID. In this exemplary illustration, the array ports 56 of the storage array 16a have name-ID pairs of (apa, 0) and (apb, 1). The array-facing switch ports 50 have the following name-ID pairs: array-facing switch port (afa, 300) is coupled to the array port 56 (apa, 0), and array-facing switch port (afb, 301) is coupled to an array port 56 (apb, 1).

Each LUN 60 in the array 16a also has a name and a LUN number, referred to as a name/number pair (LUN name, LUN number). As an example, the array 16a includes a LUN with a name/number pair of (a0, L00)—the LUN has a name of "a0" and a LUN number of L00. In the example shown, the LUNs with LUN numbers L00, L01, L02, L10, L11, L12, L20, L21, L22, L30, L31, L32, L40, L41, L42, L50, L51, and L52 are accessible through the array port (apa, 0), and LUNs with LUN numbers L50, L51, L52, L60, L61, L62, L70, L71, L72, L80, L81, L82, L90, L91, and L92 are accessible through array port (apb, 1).

In one embodiment, the Fibre Channel switch 14 includes a name server database 70. The switch 14 uses the name server database 70 to assign IDs to host ports 52 and to array ports 56 during initialization. The name server database 70 includes a name server table 72 used by the switch 14 to resolve IDs to names. In another embodiment, a name server, separate and distinct from the switch 14, maintains the name-server database 70.

Figure 3:
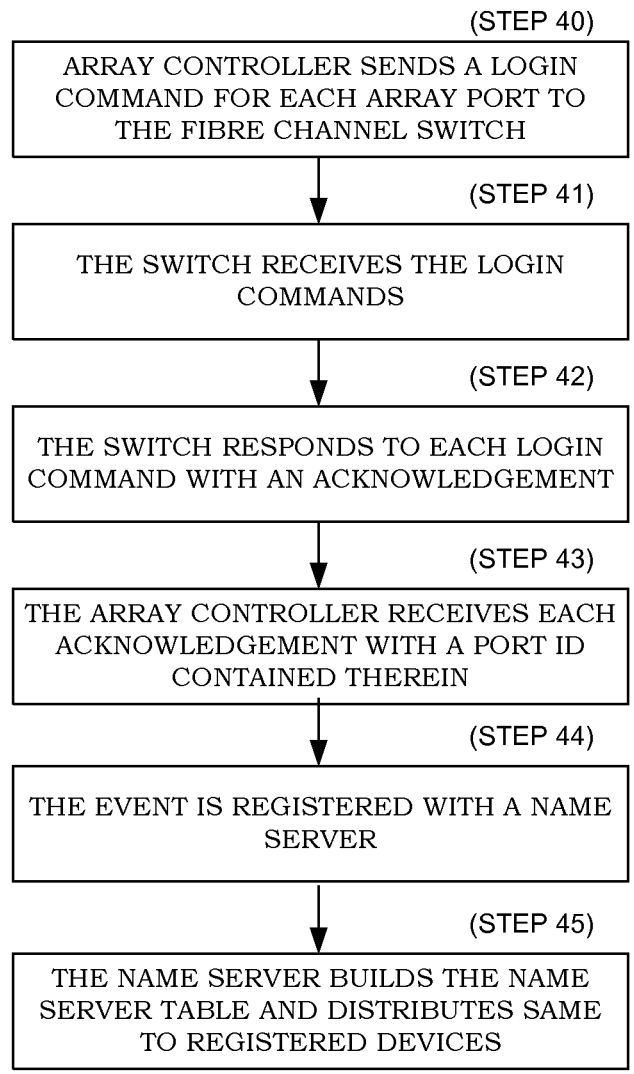
FIG. 3 is a flow diagram of an embodiment of a process by which the switch assigns port IDs to array ports of the storage array.

FIG. 3 shows an embodiment of a process by which Fibre Channel switch 14 assigns port IDs in accordance with the ANSI T11 Fibre Channel standards. In general, during initialization, a Fibre Channel device attached to a switch port, for example the array 16a, sends the names of the array ports 56 to the switch 14. In response, the name server database 70 sends, to the storage array 16a, an ID for each array port 56. The name server database 70 stores each array port name and corresponding ID in an entry in the name server table 72. After the array 16a is initialized, the switch 14 sends the name server table 72 to all members of the SAN 10 registered to receive state change notifications. This includes the hosts 12 (and the management station 18). The hosts 12 have the IDs of the arrays 16 so that Fibre Channel communications between the hosts 12 and arrays 16 can ensue.

More specifically, the array controller 65 sends (step 40) a port login "FLOGI" command for each array port (i.e., ports 0 and 1) to the switch 14 containing the array port name. The switch (step 41) receives the port login commands and responds (step 42) by sending an acknowledgement message to the array controller 65. Each acknowledgement message contains a Port ID for the array port for which a login command has been sent. The array controller 65 receives (step 43) the acknowledgement message. The event is registered (step 44) with a name server. During this registration process, the name server updates (step 45) the name server table 72 containing port names and their corresponding port IDs and distributes the table 72 to the devices, including hosts 12, 18, that are registered to receive it.

FIG. 4 shows a portion of an exemplary embodiment of the name server table 72. The name server table 72 includes multiple entries 74. Each entry 74 includes a port name field 76 and a port address field 78. The full contents of the name server table 72 are described in the Fibre Channel Name Server MIB, described in the IETF RFC 4044, "Fibre Channel Management MIB", herein incorporated by reference. In the example of FIG. 4, the name server table 72 includes entries 74 for the port names apa and apb. The port ID 0 and port ID 1 have been assigned by the Fibre Channel switch 14 to the port names apa and apb, respectively.

After the hosts 12 have IDs to access the array ports 56, they can learn what LUNs 60 are available. LUN names and numbers are managed at the array level. Each host 12 sends a query to each array port 56 ID, in turn, requesting a list of available LUN numbers. After the LUN numbers for a given array port ID are known, the host 12 is able to query each LUN 60 by using a combination of the port ID and LUN number to access the LUNs 60. The host 12 then queries each LUN 60 for its corresponding LUN name. After the host 12 has gathered this information, it builds a directory LUN table 80 that relates LUN names, to port IDs and LUN numbers.

FIG. 5 shows a representative embodiment of a LUN table 80. The LUN table 80 includes an entry 82 for each LUN 60 that the host has discovered. Each entry 82 includes a LUN name field 84, a port ID field 88, and a LUN number field 90, which, in combination, identify the LUN 60. In the portion of the table shown, the LUN table 80 for a host 12 includes the LUN names, port IDs, and LUN numbers for the LUNs 60 on the array 16a for each port ID 0 and 1. As representative examples, one entry 82 shows a LUN with name a0 and LUN number L00 associated with Port ID 0, and another entry 82 shows a LUN with name e1 and LUN number L71 associated with Port ID 1.

During operation, hosts 12 refer to LUNs 60 by their LUN numbers. To access a LUN 60, a host port 52 sends a message whose Fibre Channel address includes the array port ID and LUN number. The switch 14 parses the port ID portion of the address in order to forward the message to the identified array port 56. The array 16 then uses the LUN number portion of the address to access the proper LUN 60 within the array 16. For example, if host 12a needs to access LUN #L71, the host port 52 sends a message to an address that includes the port ID 1 and the LUN number 71. The switch 14 sees the port ID 1 and sends the message to the array port 56 with ID 1. The array 16a sees that the message is directed to the LUN # L71 and proceeds to perform the appropriate operation on LUN number 71.

Referring back to FIG. 2, the LUNs 60 are arranged in several separately accessible sub-arrays or storage groups 66, also referred to herein as virtual arrays, individually labeled 66a, 66b, 66c, 66d, and 66e. The term "storage group" can have different meanings in different contexts. For example, a "storage group" in prior art, software-based virtual arrays include a host and a set of LUNs. For clarity, a "storage group" as used herein is a group of LUNs (i.e., without a host).

As examples, a first storage group or virtual array 66a includes LUN numbers L00-L12, and a second storage group or virtual array 66b includes LUN numbers L20-L32. Storage groups appear as individual virtual arrays to the hosts 12 and may be referred to herein as "presented virtual arrays". The number of virtual arrays in a storage array and the number of LUNs in a virtual array can vary from that shown with respect to storage array 16a. A given LUN can belong to one virtual array only.

Although each of the virtual arrays described herein is shown to reside entirely within a single physical storage array, presented virtual arrays can span multiple physical storage arrays. Mechanisms for presenting virtual arrays that span multiple physical storage arrays are described in the commonly assigned co-pending U.S. patent application Ser. No. 11/427,646, filed Jun. 29, 2005, titled Spanning Virtual Arrays Across Multiple Physical Storage Arrays, the entirety of which patent application is herein incorporated by reference.

The Fibre Channel controller 65 (shown), a separate controller, pre-configured software, dynamic user programming of the array 16, or any combination thereof, can determine which LUNs are within each virtual array. Each virtual array 66 may also include a gatekeeper 68 (i.e., a small LUN) for maintaining metadata about the LUNs within that virtual array (e.g., the name and number of each LUN).

Each virtual array 66 is also associated with at least one unique "virtual port ID". These virtual port IDs are established over each physical port (apa, apb) on the array 16a. In general, each presented virtual array 66 is assigned a number of virtual port IDs depending upon a number of physical ports through which that virtual array is accessible.

In the example shown, the virtual array 66a is associated with the physical array Port ID 0 and is assigned one virtual port ID v0. The virtual array 66b is associated with the physical array Port ID 0, and is assigned one virtual port ID v1. The virtual array 66c is associated with the physical array port having Port ID 0 and with the array port having Port ID 1. Thus, the virtual array 66c is assigned two virtual port IDs v2 and v5. The virtual arrays 66d, 66e are each associated with the physical array port ID 1 and are assigned virtual port IDs v3 and v4, respectively. Accordingly, each virtual array 66 has assigned thereto at least one virtual port ID by which the hosts 12 can access the LUNs that are within that virtual array.

In addition, each host 12, 18 or host application 22, 28 may be configured to have access to one virtual array, but not to the other virtual arrays within the storage array 16a. For example, it can be arranged to have the first virtual array 66a be accessible to the host 12a only, and the second virtual array 66b be accessible to the host 12b only. Such an arrangement can provide security against data corruption and can provide ease of management for host applications.

Figure 6:
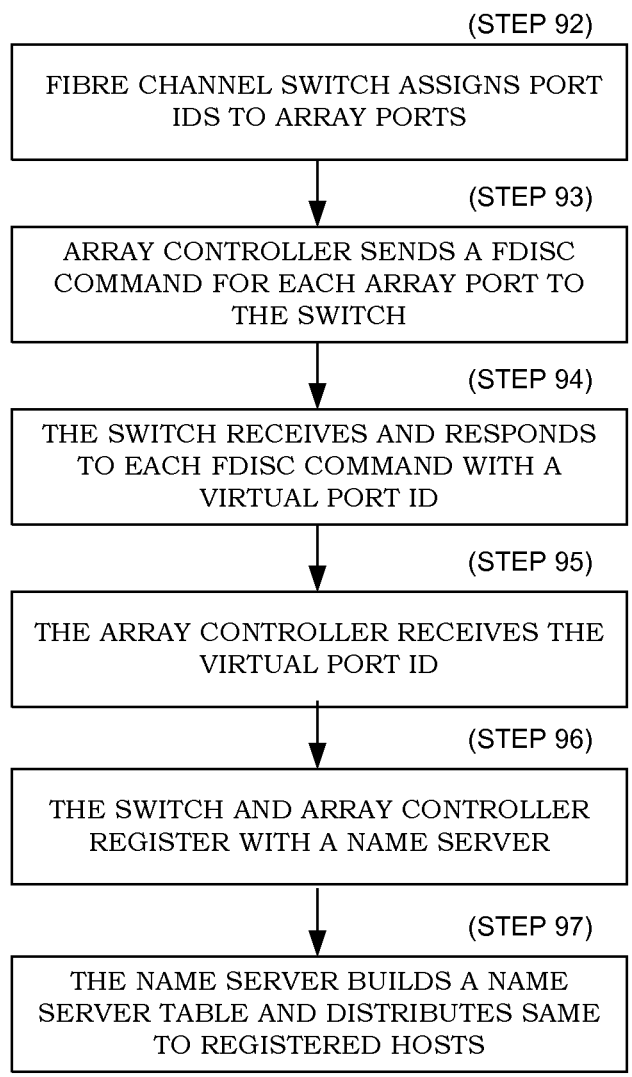
FIG. 6 is a flow diagram of an embodiment of a process for assigning virtual port IDs to array ports of the storage array.

In one embodiment, the switch 14 assigns the virtual port IDs. The ANSI T11 Fibre Channel standards, which define Fibre Channel virtual ports used by hosts, may be extended to support storage arrays. FIG. 6 shows an embodiment of a process by which the switch, in conjunction with the Fibre Channel array controller 65, assigns virtual port IDs.

At step 92, the switch 14 assigns port IDs to the array ports 56 and constructs the name server table 72 as described in connection with FIG. 3. To assign a virtual port ID to each array port 56, the array controller 65 sends (step 93) an "FDISC" command containing a virtual port name for that array port to the switch 14. The switch 14 receives the FDISC command and responds (step 94) by sending a virtual port ID to the array controller 65. The array controller 65 receives (step 95) the virtual port ID from the switch 14.

The switch 14 and array controller 65 then perform (step 96) the registration process to add the virtual port name and virtual port ID to the name server table 72. The sending of a FDISC command and issuing of a response repeats for each virtual port ID assigned for each physical array port. The name server builds and distributes to the devices (step 97) a name server table 72', in a manner similar to that previously described with respect to name server table 72 (FIG. 7), except the name server table 72' associates multiple virtual port IDs with the physical port names.

FIG. 7 shows an example of such a name server table 72', including entries 74'. Each entry 74' has a port name field 76, a port ID field 78, a virtual port name field 98, and a virtual port ID field 99. In the example shown, the name server table 72' associates the physical array port apa with Port ID 0, and with the virtual port names/IDs of (vn0, v0), (vn1, v1), and (vn2, v2). The physical array port apb is associated with Port ID 1 and with the virtual port names/IDs of (vn3, v3), (vn4, v4), and (vn5, v5). Upon receiving the name server table 72', the hosts 12 receive the virtual port IDs of v0, v1, v2, v3, v4, and v5.

After receiving the virtual port IDs, the hosts 12 build their directory LUN tables 80' in a manner similar to that previously described with regard to FIG. 5, except that LUN names and numbers are associated with virtual port IDs. Each host 12 sends a query to each virtual array port ID (here, e.g., v0-v5), in turn, requesting a list of available LUN numbers. Hosts 12 do not distinguish between virtual and physical port IDs. The hosts 12 do not recognize that they are using virtual port IDs to communicate with the storage arrays. From the hosts' perspective, the port IDs are physical port IDs (although, in actuality, the port IDs are virtual port IDs).

After the LUN numbers for a given virtual array port ID are known, the host is able to query each LUN 60 by using a combination of the virtual port ID and LUN number to access the LUN. The host 12 then queries each LUN 60 for its corresponding LUN name. After the host has gathered this information, it builds a directory LUN table 80' that relates LUN names, virtual port IDs, and LUN numbers.

FIG. 8 shows an exemplary representation of the LUN table 80', including an entry 82' for each discovered LUN. Each entry 82' includes a LUN name field 84, a virtual port ID field 86, and a LUN number field 90, which, in combination identify the LUN. For example, the LUNs 60 associated with the presented virtual array 66a, through virtual port ID v0, are (a0, L00), (b0, L01), (c0, L02), (d0, L10), (e0, L11), and (f0, L12). Note also that the presented virtual array 66c (LUNs L40-L52) is dual-ported; that is, it is accessible through virtual port IDs v2 and v5. LUNs in dual-ported presented virtual arrays may have two separate LUN numbers as well, one for use when accessed on the first virtual port ID, and the second for use when accessed on the second virtual port ID. Dual-ported presented virtual arrays can be useful for high availability purposes.

The provision of unique virtual IDs for each virtual array 66 allows the switch 14 to apply zoning such that each host 12 has access to designated virtual arrays only. The commonly assigned co-pending U.S. patent application Ser. No. 11/318,757, filed Dec. 27, 2005, herein incorporated by reference, describes a mechanism that can be used to implement zoning at the LUN level.

Management Interface Presentation

Referring back again to FIG. 2, each virtual array 66 has its own management interface 63 that the virtual array presents to hosts 12, 18 for use by management applications running on those hosts to communicate individually with the virtual array. By running a management application, an administrator is able to manage each virtual array individually and its associated LUNs. In one embodiment, the management interface 63 of each virtual array 66 includes a logical serial number 64, a virtual array name, an IP address, and a gatekeeper 68 (shown separately from the interface 63).

During initialization of the storage array 16a, each virtual array 66 is given a virtual array name (e.g., factory-set, administrator assigned), configured with an IP address, and assigned a unique (worldwide) logical serial number 64. The logical serial number 64 can be used to uniquely identify the virtual array 66 to which it is assigned. Initially, the logical serial number 64 of each virtual array 66 is derived from the unique (worldwide) physical serial number 62 of the storage array 16a.

As an oversimplified example, in FIG. 2 the logical serial number 64 of the virtual array 66a is derived by appending two alphanumeric digits to the physical serial number 62. For example, the physical serial number 62 is 123456 for the storage array 16a and the logical serial number 64 for virtual array 66a is 123456A0; for virtual array 66b, 123456B1; for virtual number 66c, 123456C2; for virtual array 66d, 123456D3; and for virtual array 66e, 123456E4. Logic or software within each storage array 16 can derive and store the initial logical serial numbers upon the array's initialization.

The logical serial numbers 64, in effect, disassociate the serial numbers of the virtual arrays 66 from the physical hardware (i.e., the storage array). When each virtual array 66 presents its serial number as part of its exposed virtual array management interface 63, the virtual array 66 is presenting its logical serial number. The physical serial number of the storage array does not change, whereas the logical serial number changes because of data migration events, as described herein.

Figure 9:
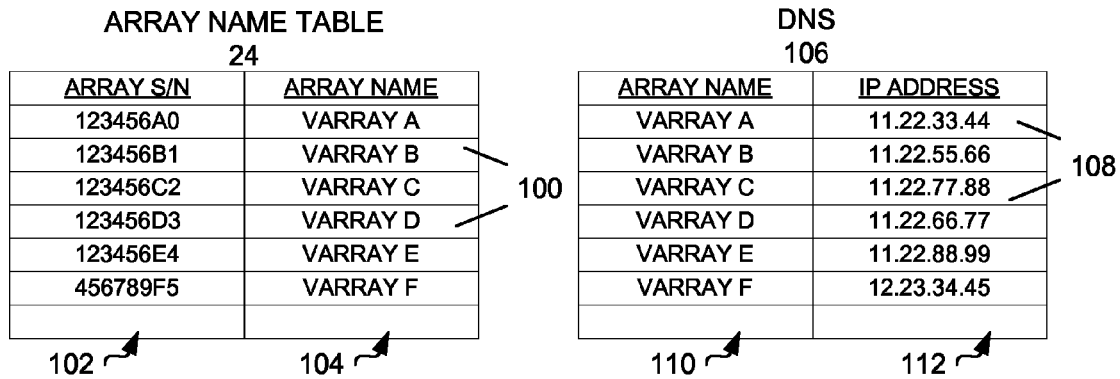

Each virtual array 66 also exposes its virtual array management interface 63 to the hosts 12, 18. With this information, the management station 18 builds the array name table 24 that maps array serial numbers to array names. FIG. 9 shows an embodiment of the array name table 24 having entries 100. Each entry 100 includes a serial number field 102 and an array name field 104. In the example shown, the array name table 24 associates logical serial number "123456A0" with array name "VARRAY A" and logical serial number "123456B1" with array name "VARRAY B". The array names VARRAY A, VARRAY B correspond to the virtual array names presented by virtual array 66a, 66b respectively—the array name table 24 does not distinguish between virtual and physical array names, and management application does not need to be aware that it is communicating with a virtual array rather than a physical storage array.

FIG. 9 also shows an embodiment of a DNS table 106 for mapping array names to IP addresses. The DNS table 106 includes entries 108, each with an array name field 110 and a network address field 112. In the example shown, the DNS table 106 associates the array name "VARRAY A" with IP address 11.22.33.44 and the array name "VARRAY B" with IP address 11.22.55.66.

The management station 18 can communicate with the LUNs 60 at the storage arrays by sending management messages (e.g., in IP packets) over the network 20 using the appropriate IP address of a targeted storage array. (From the perspective of the management station 18, the virtual arrays 66 are indistinguishable from individual physical storage arrays). In preparing messages for transmission over the network 20, the management application 22 uses the serial number exposed by the targeted storage array (actually, a virtual array) to obtain its array name from the array name table 24. The management application 22 also communicates with the DNS server 26 to obtain an IP address based on the array name retrieved from the array name table 24.

For example, if the management application 22 desires to access the virtual array 66b, e.g., the management application 22 acquires the array name "VARRAY B" from the array name table 24, using the serial number "123456B1", which was exposed by the virtual array 66b, as an index into the array name table 24. The serial number exposed by the virtual array 66b is its logical serial number 64, initially derived from the physical serial number 62 of the storage array 16a before any data migration event. Using this array name, the management application 22 queries the DNS server 26 for the IP address associated with this array name. After obtaining the IP address, the management application 22 can communicate with the virtual array 66b over the network 20, in order to execute management-related operations with the virtual array 66b and its associated LUNs.

Metadata Migration

During a data migration event, in which data are transferred from a source virtual array to a destination virtual array, a host 12 may be running a storage application that is presently providing certain storage functionality at the storage array from which data are being migrated. To ensure that the migration of the data and connections does not disrupt the execution of the storage application, metadata used by the storage application may also be migrated.

Figure 10:
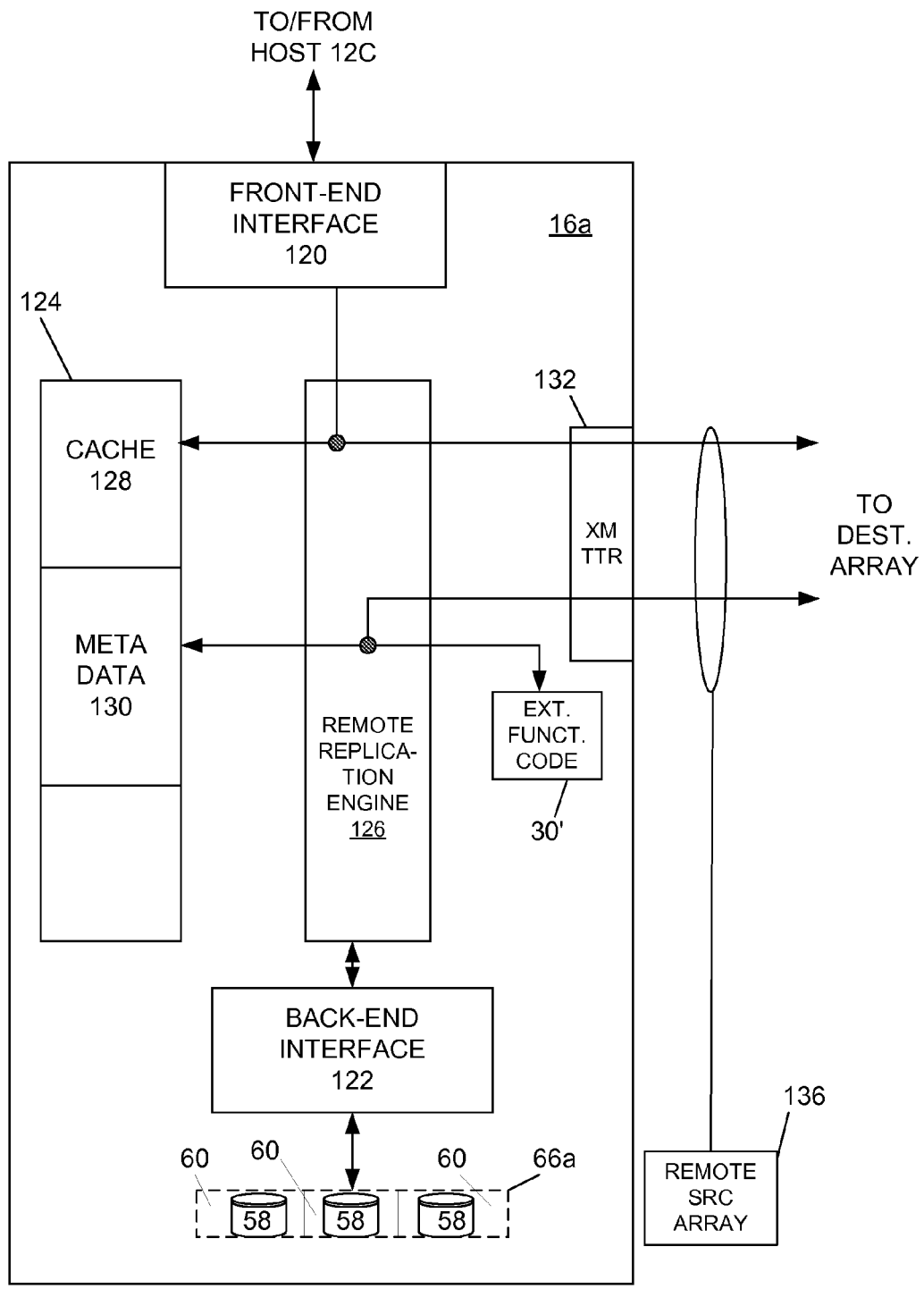
FIG. 10 is a functional block diagram representation of an embodiment of a storage array.

FIG. 10 shows an embodiment of the storage array 16a (again, as a representative example of the storage arrays 16 in the SAN 10). The storage array 16a includes a front-end interface 120 for communicating with the hosts 12 (here, as an example, with host 12c), a back-end interface 122 for writing to and reading from the LUNs 60, memory 124, and remote replication engine 126. In this example, the LUNs 60 belong to the virtual array 66a. Other virtual arrays of the storage array 16a are not shown to simplify the illustration. The memory 124 has a plurality of sections including a first section allocated to cache 128 and a second section allocated to store metadata 130.

Remote replication engine 126, in general, sets up a primary mirror and synchronously copies the data of that mirror and all updates to that data to a secondary mirror. As shown, the remote replication engine 126 is in the data path between the host 12c and the LUNs 60. The remote replication engine 126 is also in communication with the cache 128 and with a transmitter 132 for forwarding data to a destination storage array (to become the data of the destination virtual array). Data migration products such as MIRRORVIEW SYNCHRONOUS® and SRDF/S® (Symmetrix Remote Data Facility), both of EMC Corp. of Hopkinton, Mass., are examples of remote replication software that may be used to migrate data.

The storage array 16a also includes the program code 30 (FIG. 1) for providing extended storage functionality. The program code 30 is an array-side component of the extended storage functionality application 28 (FIG. 1) executing at the host 12c. This extended storage functionality program code 30 generates, stores, and updates metadata 130 in the memory 124. The metadata influences the execution of the extended storage functionality application 28.

To illustrate, consider an example of a host application that provides the storage functionality of data backup of a storage device. Initially, metadata can indicate that none of the data in the storage device has yet been copied to a backup storage device. After the backup operation commences, other metadata can be used to measure the current progress of the backup, i.e., which logical units have been copied and which logical units have not, and which logical units have incurred an update since the start of the back-up operation. In general, the proper behavior of the backup operation depends upon such metadata; in this sense, the metadata influences the execution of the extended storage functionality application 28 and its corresponding array-side program code component 30.

In the embodiment of the storage array 16a shown in FIG. 10, the remote replication engine 126 is in the metadata path between the extended functionality program code 30 and the memory 124. In general, during a data migration event, the remote replication engine 126 synchronously copies and forwards the metadata 130 stored in the memory to the destination storage array. The remote replication engine 126 also synchronously copies updates to the metadata 130. Such updates are generated when the extended storage functionality code 30 writes new metadata to or changes existing metadata in the memory 124.

In one exemplary implementation, the remote replication engine 126 treats the metadata as logical units of storage (i.e., Fibre Channel LUNs). Accordingly, the metadata can appear as numbered LUNs to the remote replication engine 126, similar to the LUNs 60. In addition, the remote replication engine 126 issues device-access function calls to write and read from a metadata LUN, just as the remote replication engine 126 accesses other LUNs 60 in the storage array 16a. Unlike the LUNs 60, though, metadata LUNs are not exposed to the hosts 12, 18.

Each metadata LUN belongs to one of the virtual arrays 66. The association of metadata LUNs to virtual arrays may be established when the virtual arrays 66 are initially defined, or dynamically, e.g., during the execution of an extended storage functionality application.

Generally, not all metadata are to be replicated and forwarded to the destination storage array. For example, the metadata related to the network connection between the storage array 16a and the destination storage array is information that need not be replicated and forwarded to the destination storage array. Notwithstanding, the storage array 16a may have established another network connection with a second storage array (e.g., source array 136 in FIG. 10). Proper operation of the extended storage functionality application 128 after the data migration event may require that the metadata related to this network connection also be transferred to the destination array. To distinguish between metadata that are not to be forwarded from metadata that are to be forwarded, each metadata have an attribute associated therewith. A value assigned to this attribute determines whether the remote replication engine 126 copies and forwards the associated metadata.

Data Migration Event

In general, a data migration event involves moving all data resident in exposed LUNs of one presented virtual array, referred to as the source virtual array, to the LUNs of another presented virtual array, referred to as the destination virtual array. The data migration event can involve an exchange of data, wherein data resident in LUNs of the destination virtual are moved to the source virtual array. The data migration event occurs transparently to the hosts 12, 18 and any applications hosted thereon. Commonly assigned co-pending U.S. patent application Ser. No. 11/318,734, filed on Dec. 27, 2005, describes a host transparent mechanism for migrating data and connections between source and destination virtual arrays, the entirety of which application is incorporated by reference herein. In addition to migrating data and connections, embodiments of the invention migrate virtual array management interfaces and, in some cases, metadata.

Figure 11:
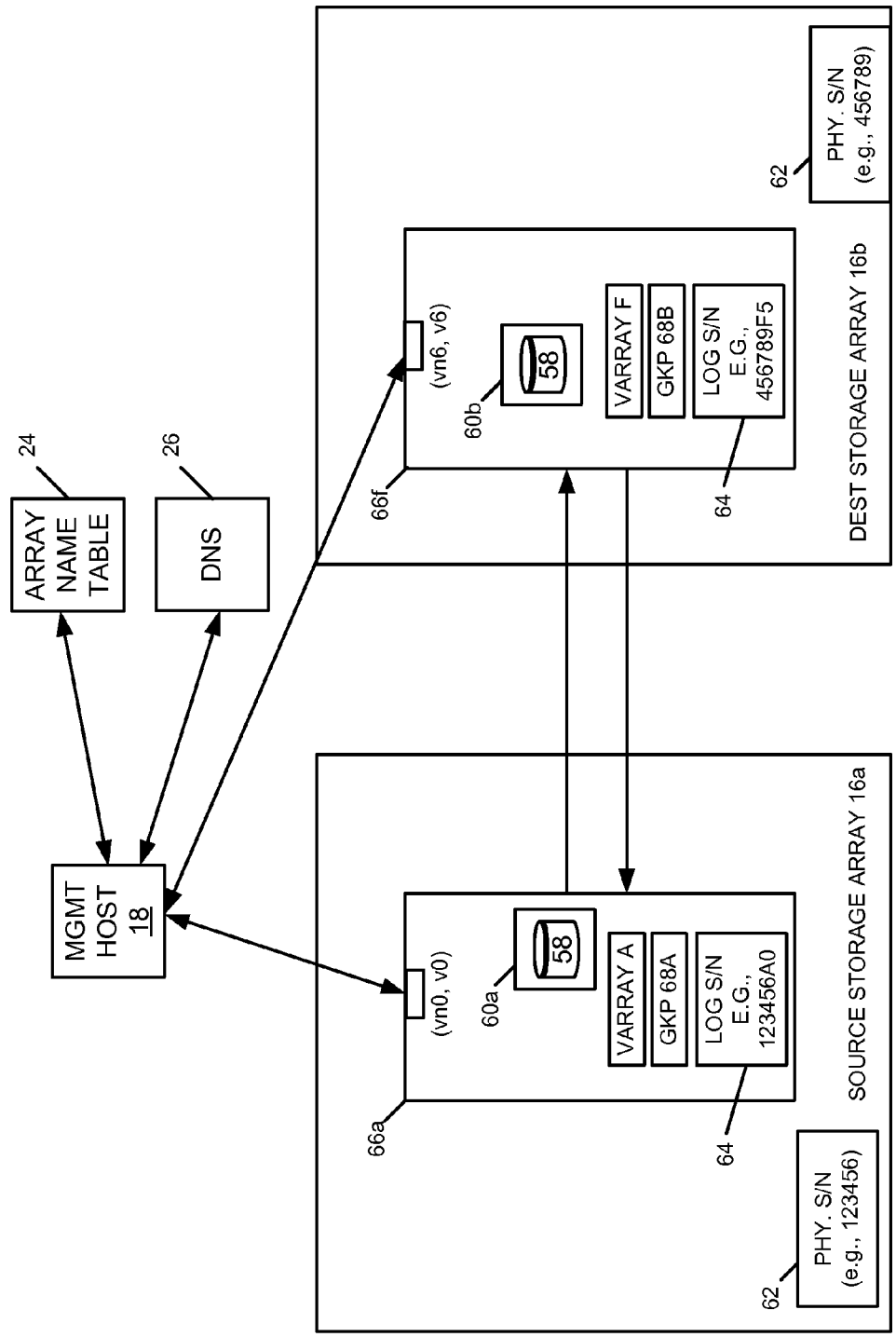
FIG. 11 is a functional block diagram representation of virtual array migration.

FIG. 11 shows a portion of the storage area network 10 of FIG. 1, including the storage arrays 16a, 16b. The physical storage array 16a includes a presented virtual array 66a; the physical storage array 16b includes a presented virtual array 66f. The host 18 is in communication with the storage arrays 16a, 16b, the array name table 24, and the DNS 26. For simplification of the illustration, the hosts 12, the switch 14, the network 20, and the other physical and virtual arrays of FIG. 1 are not shown. In addition, the switch 14 and each array 16a, 16b communicate, as previously described, to obtain Port IDs and virtual Port IDs, and to produce a database server name table 72' (FIG. 7) that is uploaded to the hosts 12 for building LUN tables.

Figure 12:
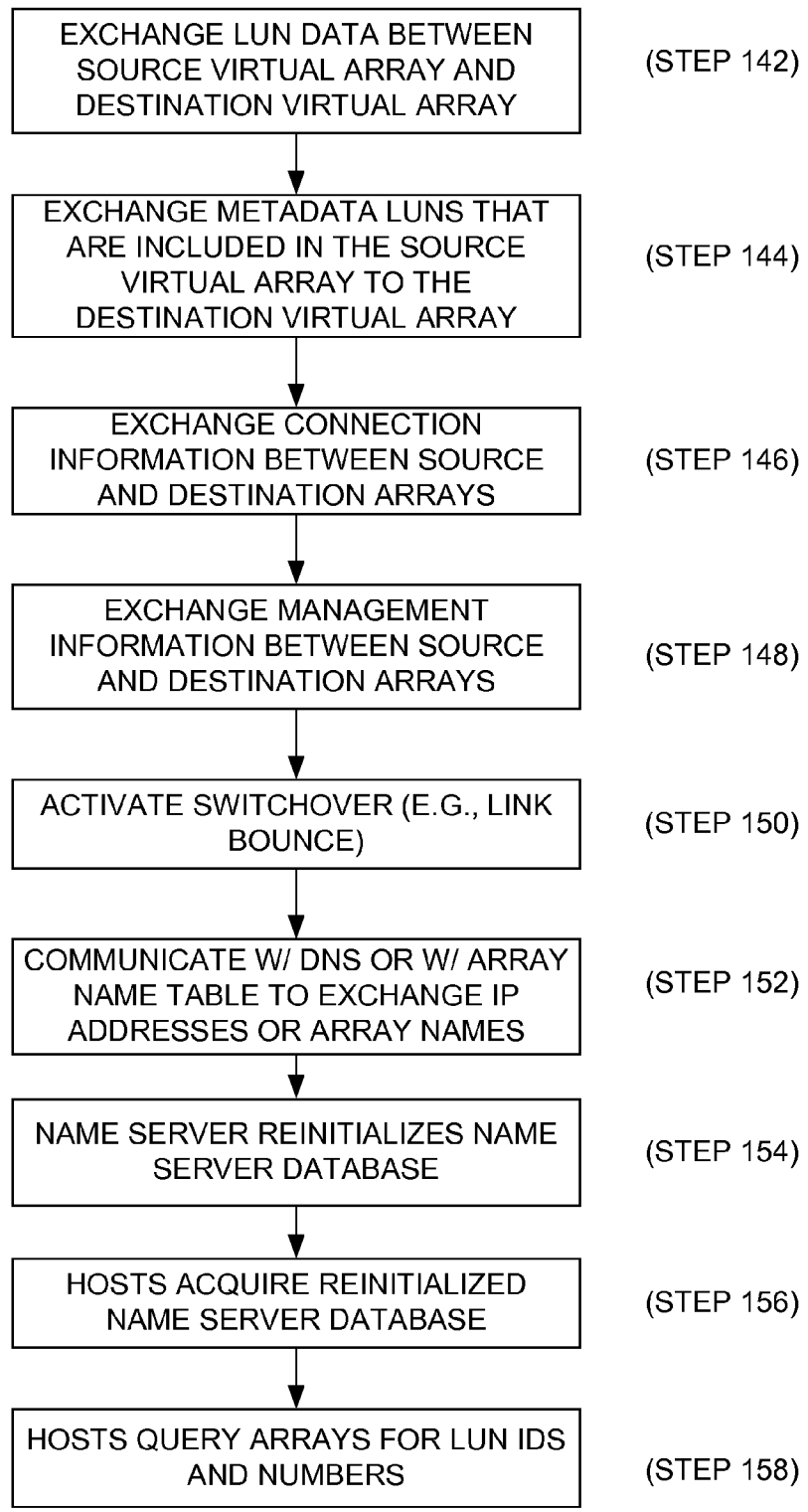
FIG. 12 is a flow diagram of an embodiment of process for performing virtual array migration as illustrated in FIG. 11.

FIG. 12 shows an embodiment of a process 140 generally representative of a data migration event. In the description of the process 140, reference is also made also to FIG. 11. The virtual array 66a of the source storage array 16a, for example, is the source virtual array, and the virtual array 66f of the destination storage array 16b, for example, is the destination virtual array. At step 142, the remote replication engines 126 of the source and destination storage arrays 16a, 16b exchange the data of the LUNs 60a of the source virtual array 66a with that of the LUNs 60b of the destination virtual array 66f and synchronizes the virtual arrays 66a, 66f.

In one embodiment, the remote replication engines 126 also synchronously exchange (step 144) each metadata LUN (including updates to that metadata LUN) that belongs to the source and destination virtual arrays 66a, 66f, provided the attribute associated with that metadata LUN indicates that copying is to be performed.

At step 146, the source and destination virtual arrays 66a, 66f exchange Fibre Channel connections. More specifically, in accordance with one implementation, the virtual array port names for the source virtual array 66a are exchanged with the virtual array port names of the destination virtual array 66f, and the LUN names and numbers of the source virtual array 66a are exchanged with the LUN names and numbers of the destination virtual array 66f.

At step 148, the source and destination virtual arrays 66a, 66f exchange virtual array management interfaces. More specifically, this exchange includes the exchange by the source and destination virtual arrays 66a, 66f of their current logical serial numbers 64, array names, and gatekeepers 68. Consequently, the logical serial number 64, array name (VARRAY F), and gatekeeper 68b of the destination virtual array 66f become the new logical serial number, array name, and gatekeeper of the source virtual array 66a and the logical serial number 64, array name (VARRAY A), and gatekeeper 68a of the source virtual array 66a become the new logical serial number, array name, and gatekeeper of the destination virtual array 66f.

After the data and metadata are synchronized on the source and destination virtual arrays 66a. 66f, and the exchanges of connection and management information are complete, a switchover is activated (step 150). To achieve a transparent data migration event, the switchover occurs atomically. One of the source and destination arrays, or an administrator from a control station, directs (step 152) the DNS server 26 to exchange the IP addresses of the source and destination virtual arrays 66a, 66f. Alternatively, the management application 22 is directed to swap the array names of the source and destination virtual arrays 66a, 66f within the array name table 24.

The switchover induces the switch 14 (or, more specifically, the name server) to build (step 154) a new name server table 72' for the name server database 70. The new name server table 72' reflects the new array port and virtual name associations. The switch 14 (or name server) issues a state change notification that prompts the registered devices (including hosts 12, 18) to upload (step 156) the new name server table 72'. The hosts 12, 18 then query (step 158) each of the arrays 16a, 16b to learn the new LUN name and address associations of the virtual arrays, and to receive the logical serial numbers from the virtual arrays.

After completion of the data migration event, the data, metadata, connections, and management information have migrated from the source virtual array 66a to the destination virtual array 66f, transparently, without interruption to any applications running on the hosts 12, 18. From the perspective of the hosts 12, 18, the data migration is transparent, despite the changes to the addresses of the array ports 56, because the virtual port names and LUN numbers, with which the hosts 12 address their communications, are unchanged. In addition, the logical serial numbers now sent to the hosts 12 by the virtual arrays 66a, 66f contribute to the appearance, from the hosts' 12 perspective, that the data has not moved, and that the hosts can still access the data at the same virtual array as if the data migration event never occurred.

From the perspective of the management application 22, the data migration is transparent because the management information that previously directed communications to the source virtual array 66a before the data migration event, now directs communications to the destination virtual array 66f after the data migration event. From the perspective of the extended storage functionality application 28 executing on the host 12c, although its execution has migrated to the destination virtual array 66f, the metadata needed to continue executing properly has also migrated to the destination virtual array 66f.

Although the process 140, as described, involves exchanges between the source and destination storage arrays of data, connection, management interfaces, and metadata—in particular, between the source and destination virtual arrays 66a, 66f—it is to be understood that a one-way transfer of such information, from the source virtual array 66a to the destination virtual array 66f, is sufficient in the practice of the invention.

Management Interface Migration

During the data migration event, in one embodiment the source and destination virtual arrays 66a, 66f exchange virtual array management interfaces including their logical serial numbers 64. More specifically, the logical serial number 64 for the source virtual array 66a becomes "456789F5", whereas the logical serial number 64 for the destination virtual array 66f becomes "123456A0". Note that the physical serial numbers 62 assigned to the source and destination storage arrays 16a, 16b remain unchanged by the data migration event.

For the migration of the data and connections to be transparent to the management application 22, the management application should be able to continue addressing messages to serial number "123456A0", e.g., as though the data migration had not occurred, and yet such messages should be routed to the destination virtual array 66f to which the data have been migrated. Exchanging the array names within the array name table 24 is one mechanism for accomplishing this purpose, as described below in connection with FIG. 13. Another mechanism is to exchange the associated IP addresses in the DNS table 26, as described below in connection with FIG. 14.

Figure 13:
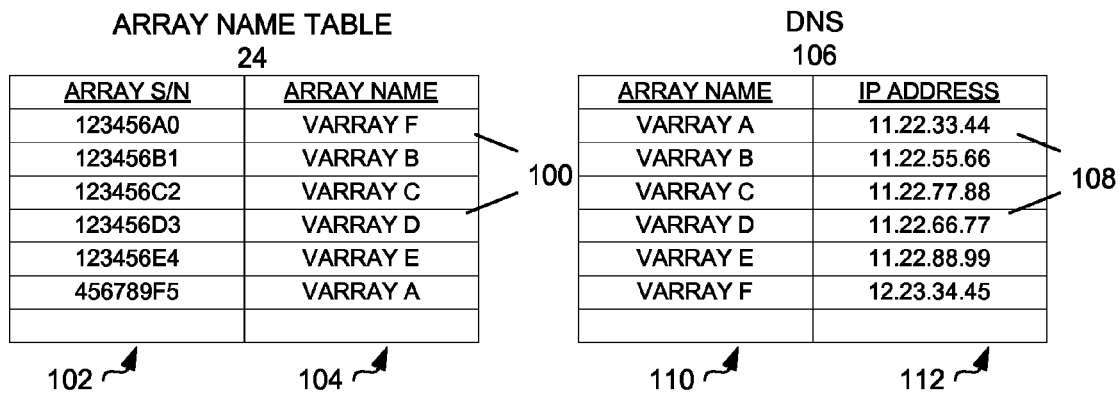
FIG. 13 is a first exemplary representation of the array name and DNS tables of FIG. 9 after completion of the data migration event.

FIG. 13 shows a first exemplary representation of the array name table 24 and DNS table 106 after completion of the data migration event. In this exemplary representation, the array names associated with virtual arrays 66a, 66f, namely "VARRAY A" and "VARRAY F", respectively, are exchanged within the array name table 24, whereas the DNS table 106 is unchanged. More specifically, the entry 100 of the array name table 24 that previously associated the serial number "123456A0" with the array name "VARRAY A" (FIG. 9), as a result of the exchange now associates serial number "123456A0" with the array name "VARRAY F". Conversely, the entry 100 of the array name table 24 that previously associated the serial number "456789F5" with the array name "VARRAY F" (FIG. 9), now associates serial number "456789F5" with the virtual array name "VARRAY A" as a result of the exchange.

Before the data migration event, when the management application 22 prepared a message to be sent to the storage array associated with serial number "123456A0", the array name table 24 provided the array name of "VARRAY A". For the particular array name "VARRAY A", the DNS table 106 provided the IP address of 11.22.33.44. Consequently, messages issued by the management application 22 were directed to the virtual array having the IP address of 11.22.33.44, namely, virtual array 66a of the storage array 16a.

In the case of exchanging virtual array names in the array name table 24, after the data migration event, when the management application 22 prepares a message to be sent to the storage array associated with serial number "123456A0", the array name table 24 provides the array name of "VARRAY F". For the array name of "VARRAY F", the DNS table 106 provides the IP address of 12.23.34.45. Consequently, messages issued by the management application 22 are routed to the virtual array located at IP address 12.23.34.45. This is destination virtual array 66f at storage array 16b, which is the destination virtual array to which the data and connections have migrated.

Figure 14:
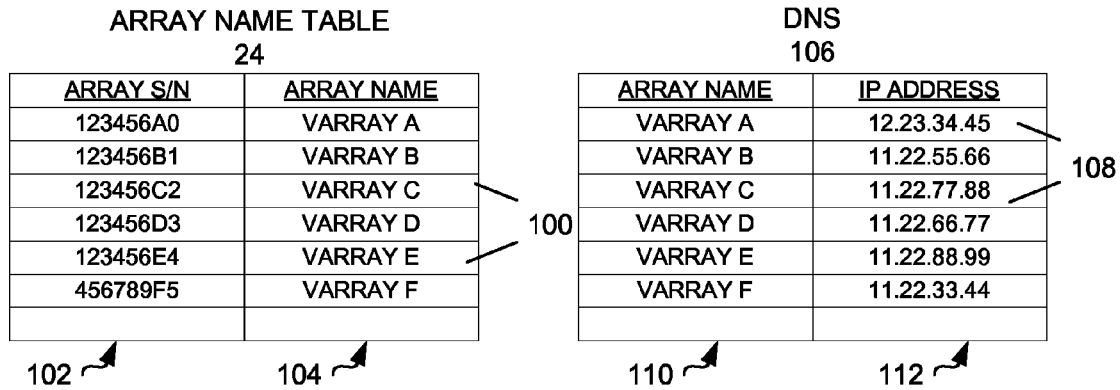
FIG. 14 is a second exemplary representation of the array name and DNS tables of FIG. 9 after completion of the data migration event.

FIG. 14 is a second exemplary representation of the array name table 24 and DNS table 106 after completion of the data migration event. In this exemplary representation, the IP addresses associated with the array names are exchanged within the DNS table 106, whereas the associations between the serial numbers and array names within the array name table 24 are unchanged. More specifically, the entry 108 of the DNS table 106 that previously associated the array name "VARRAY A" with IP address 11.22.33.44 (FIG. 9), as a result of the exchange, associates the array name "VARRAY A" with IP address 12.23.34.45. Conversely, the entry 108 of the DNS table 106 that previously associated the array name "VARRAY F" with IP address 12.23.34.45 (FIG. 9), as a result of the exchange now associates the array name "VARRAY F" with IP address 11.22.33.44.

Accordingly, before the data migration event, when the management application 22 prepared a message to be sent to the storage array associated with serial number "123456A0", the array name table 24 provided the array name of "VARRAY A". For the particular array name "VARRAY A", the DNS table 106 provided the IP address of 11.22.33.44. Consequently, messages issued by the management application 22 were directed to the virtual array at the IP address of 11.22.33.44, and the recipient of such messages was the virtual array 66a at the storage array 16a (being located at IP address 11.22.33.44).

After the data migration event, when the management application 22 prepares a message to be sent to the storage array associated with serial number "123456A0", the array name table 24 provides the array name of "VARRAY A". For the array name of "VARRAY A", the DNS table 106 provides the IP address of 12.23.34.45. Consequently, messages issued by the management application 22 are directed to the virtual array located at IP address 12.23.34.45, which is the virtual array 66f at storage array 16b, appropriately the very destination virtual array to which the data and connections have migrated.

Array Partitioning

In some instances, upgrading or replacing a physical storage array can involve migrating data from that one source storage array to multiple destination storage arrays (i.e., a 1 to N transfer). More specifically, the source storage array can have multiple source virtual arrays, and data from one set of source virtual arrays may be migrated to virtual arrays at a first destination array and data from a second set of source virtual arrays may be migrated to virtual arrays at a second destination array. (As used herein, a set of virtual arrays comprises one or more virtual arrays). In general, a data migration event involving the migration of data from a single source array to multiple destination arrays is referred to as array partitioning.

Figure 15:
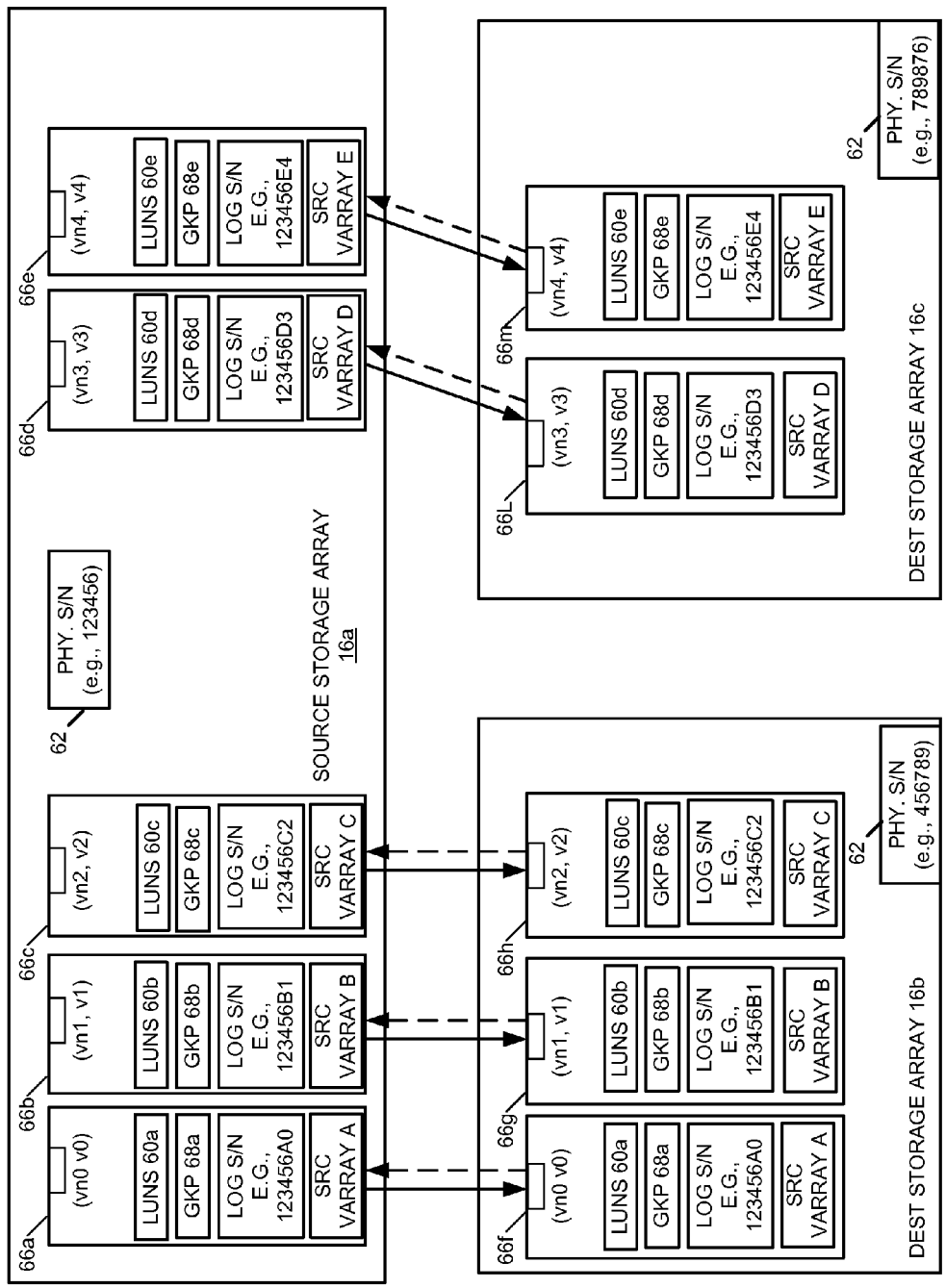
FIG. 15 is a block diagram representation of a data migration event in which a single source storage array is partitioned into multiple destination storage arrays using virtual array migration.

FIG. 15 shows a block diagram representation of array partitioning, in which data resident in LUNs 60 of the source virtual arrays 66a, 66b, 66c, 66d, and 66e of the source array 16a are migrated to respective destination virtual arrays 66f, 66g, 66h, 66L, and 66m. These destination virtual arrays span multiple physical destination storage arrays 16b, 16c. To accomplish this partitioning, the combined number of virtual ports and number of LUNs 60 of the destination virtual arrays 66f, 66g, 66h, 66L, and 66m are at least as many as the number of virtual ports and number of LUNs 60 of the source virtual arrays 66a, 66b, 66c, 66d, and 66e. In addition, the storage capacity of each LUN of the destination virtual arrays 66f, 66g, 66h, 66L, and 66m is at least as large as its corresponding LUN of the respective source virtual arrays 66a, 66b, 66c, 66d, and 66e.

Before the array partitioning, the source storage array 16a has a unique physical serial number 62 (here, e.g., 123456), and each source virtual array has a unique logical serial number (derived from the physical serial number), a gatekeeper 68, array name, and IP address.

The pre-transfer LUNs, array port names, gatekeepers, and logical serial numbers of the destination virtual arrays 66f, 66g, 66h, 66L, and 66m are not shown in FIG. 15. Emphasis instead is placed on illustrating the results of partitioning data across the destination storage arrays 16b, 16c and destination virtual arrays 66f, 66g, 66h, 66L, and 66m, rather than on any exchange aspect of the partitioning process. (An exchange is optional and is represented with phantom arrows from the destination virtual arrays to the source virtual arrays, although the results of this portion of the exchange are not represented in the source virtual arrays). Notably, a transfer from the source virtual arrays to the destination virtual arrays, rather than an exchange, may occur without departing from the principles of the invention.

FIG. 16 shows an embodiment of an array partitioning process 200 for migrating data from the virtual arrays of the source storage array 16a to the virtual arrays of multiple destination storage arrays 16b, 16c. The process 200 occurs transparently to the hosts 12, 18 and host applications 22, 28. In the description of the process 200, reference is also made to features shown in FIG. 15. Although described with respect to two destination storage arrays, the principles of the partitioning process can apply to more than two destination storage arrays.

At step 202, the remote replication engine 126 (of the source storage array 16a) copies the data resident at the LUNs of each source virtual array to the LUNs of a corresponding destination virtual array. In this example, data of the source virtual array 66a are copied to the destination virtual array 66f; data of source virtual array 66b, to the destination virtual array 66g; data of source virtual array 66c, to the destination virtual array 66h; data of source virtual array 66d, to the destination virtual array 66L; and data of source virtual array 66e, to the destination virtual array 66m.

In one embodiment, select metadata at the source array 16a are also migrated to the destination arrays 16b, 16c. As described above, the remote replication engine 126 can access the metadata as metadata LUNs. Each metadata LUN is associated with one of the source virtual arrays 66a, 66b, 66c, 66d, 66e. If the attribute of a metadata LUN so indicates, the remote replication engine 126 copies (step 204) that metadata LUN, for forwarding to one of the destination virtual arrays. The particular destination virtual array to which the metadata LUN is forwarded depends upon the particular source virtual array with which the metadata LUN is associated. In the illustrated example, metadata LUNs associated with the source virtual array 66a are copied to metadata LUNs associated with the destination virtual array 66f.

At step 206, each source virtual array transfers its Fibre Channel connection information to the corresponding destination virtual array. The connection information sent to a particular destination virtual array corresponds with the LUNs that have been migrated to that destination virtual array. As representative examples, the virtual port name/virtual port ID pair of (vn0, v0) passes from the source virtual array 66a to the destination virtual array 66f, while the virtual port name/virtual port ID pair of (vn4, v4) passes from the source virtual array 66e to the destination virtual array 66m. Also, as a representative example, the LUN names and LUN numbers of the LUNs 60a belonging to the source virtual array 66a become associated with the LUNs of the destination virtual array 66f.

At step 208, each source virtual array transfers its associated management information (logical serial numbers, array names, and gatekeepers) to its corresponding destination virtual array. As representative examples, the source virtual array 66a sends its logical serial number, array name, and gatekeeper to the destination virtual array 66f, while the destination virtual array 66f sends its logical serial number, array name, and gatekeeper to the source virtual array 66a. An exchange of management information between the source virtual arrays and their corresponding destination virtual arrays, rather than a one-way transfer, may occur without departing from the principles of the invention.

In addition, after the completion of the copying of data and metadata and after the transfer of connection and management information, switchover is activated (step 210). The source storage array 16a, one of the destination storage arrays 16b, 16c, or an administrator control station can then communicate (step 212) with the DNS server 26 to swap the IP addresses of each corresponding pair of source and destination virtual arrays, e.g., (66*a* with 66*f*), (66*b* with 66*g*), (66*c* with 66*h*), (66*d* with 66L), and (66*e* with 66*m*). Alternatively, the array names of each corresponding pair of source and destination virtual arrays are swapped in the array name table 24.

FIG. 17 shows the array name table 24 and DNS table 106 before the array partitioning, and FIG. 18 shows the array name table 24 and DNS table 106 after the appropriate pairs of array names are swapped within the array name table. In FIG. 18, the entries 100 for the source virtual arrays (SRC VARRAY A, SRC VARRAY B, SRC VARRAY C, SRC VARRAY D, and SRC VARRAY E) have been removed from the tables 24, 106. The source virtual arrays can be removed because the destination virtual arrays (DEST A VARRAY F, DEST A VARRAY G, DEST A VARRAY H, DEST B VARRAY L, and DEST B VARRAY M) have each, in effect, replaced one of the source virtual arrays as a result of the partitioning.

FIG. 19 shows an alternative to swapping array names in the array name table 24: i.e., swapping appropriate pairs of IP addresses within the DNS table 106, as described above. Notably, the entries for the destination virtual arrays (DEST A VARRAY F, DEST A VARRAY G, DEST A VARRAY H, DEST B VARRAY L, and DEST B VARRAY M) have been removed from the tables 24, 106 in FIG. 19. These entries can be removed because the logical serial number and array name of each source virtual array (SRC VARRAY A, SRC VARRAY B, SRC VARRAY C, SRC VARRAY D, and SRC VARRAY E) have become associated with a corresponding destination virtual array, and now operate to direct communications to that destination virtual array, as described below.

Because the process of partitioning occurs transparently with respect to the management application 22 (FIG. 1) executing on the host 18, the management application 22 continues to run as though accessing data at each of the source virtual arrays. For example, the management application 22 can continue to issue messages directed to serial number "123456A0" (previously associated with the source virtual array 66*a*). Because of the exchange of array names of the source and destination virtual arrays 66*a*, 66*f* in the array name table 24, or of the exchange of IP addresses at the DNS server 26, the management messages are addressed to the IP address of the destination virtual array 66*f* after the switchover.

In one embodiment, the switch 14 contains the name server, which reinitializes (step 214) the name-server database 70. In another embodiment, the name server is separate from the switch 14. The updated name-server database is uploaded (step 216) to the registered devices, including hosts 12, 18, and the hosts subsequently query (step 218) the destination virtual arrays using the LUN ID-LUN numbers.

Array Consolidation

Figure 20:
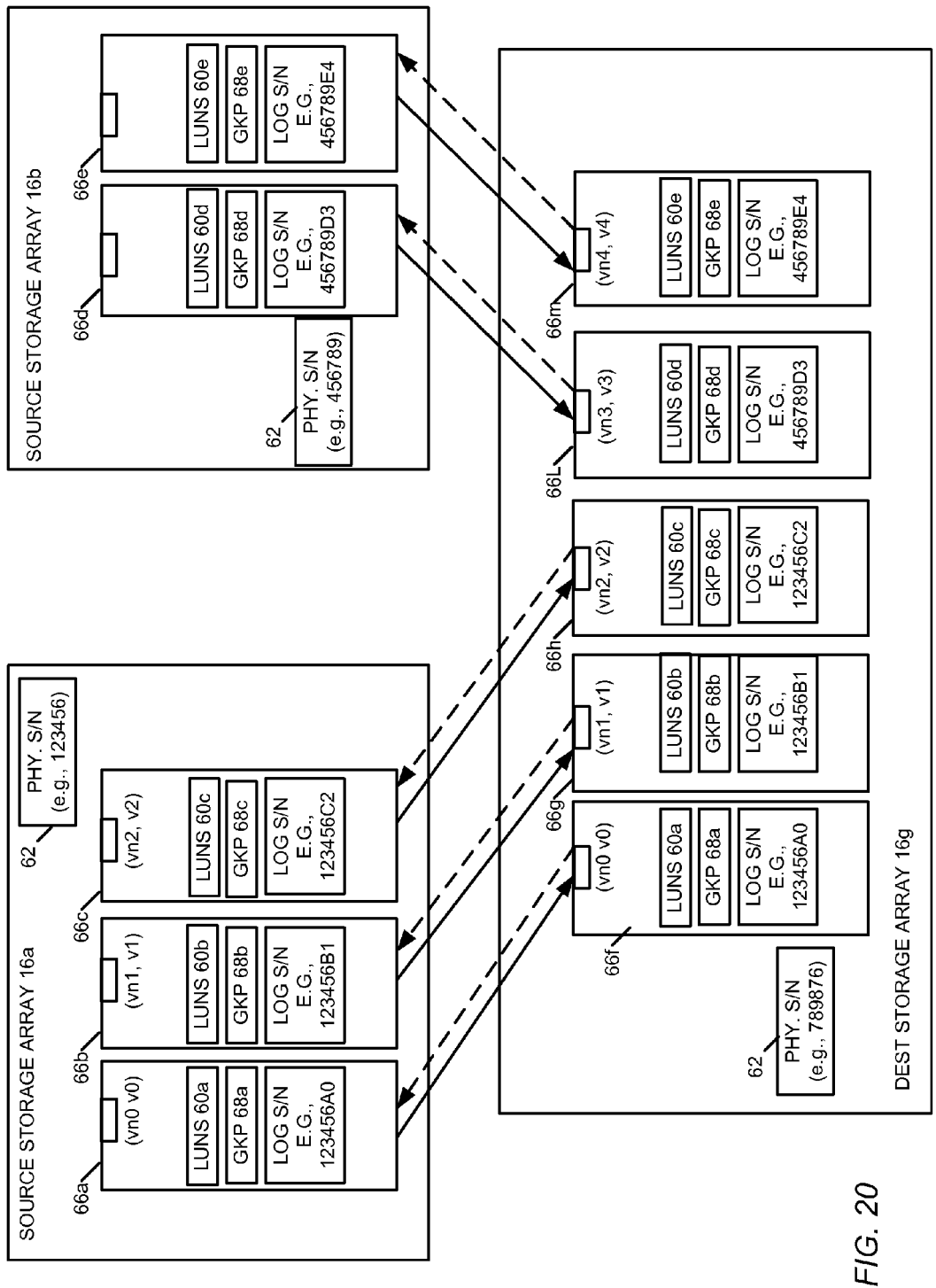
FIG. 20 is a block diagram representation of a data migration event in which data at multiple source arrays are consolidated into a single destination array using virtual array migration.

Upgrading or replacing data storage can also involve migrating data from multiple source storage arrays to a single destination storage array (i.e., an N to 1 transfer). In general, a data migration event involving the migration of arrays of data from multiple source arrays to a single destination array is referred to as array consolidation. FIG. 20 shows a block diagram representation of array consolidation in which data resident at multiple source arrays 16*a*, 16*b* are migrated to a single destination array 16*g*.

Each source storage array 16*a*, 16*b* has a plurality of virtual arrays: source storage array 16*a* has source virtual arrays 66*a*, 66*b*, and 66*c*; source storage array 16*b* has source virtual arrays 66*d*, and 66*e*. The destination storage array 16*g* has a plurality of virtual arrays 66*f*, 66*g*, 66*h*, 66L, and 66*m*. For the consolidation process, there is one destination virtual array for each source virtual array. In addition, the number of virtual ports and number of LUNs of the destination virtual arrays are at least as many as the combined number of virtual ports and number of LUNs of the source virtual arrays. In addition, the storage capacity of each LUN of the destination virtual arrays is as large as its corresponding LUN of the source virtual arrays.

Each source and destination virtual array 66 has a unique logical serial number, array name, gatekeeper, and IP address. Not shown in FIG. 20 are the pre-transfer LUNs, array port names, and logical serial number of the destination virtual arrays. Emphasis instead is placed on illustrating the results of consolidating data at the destination storage array 16*g*, rather than on any exchange aspect of the consolidation process. Accordingly, FIG. 20 shows the results of the transfer of information from the source virtual arrays to the destination virtual arrays. (An exchange of information is optional and is represented with phantom arrows from the destination virtual arrays to the source virtual arrays, although the results of this portion of the exchange are not represented in the source virtual arrays). Notably, a transfer from the source virtual arrays to the destination virtual arrays, rather than an exchange, may occur without departing from the principles of the invention.

Figure 21:
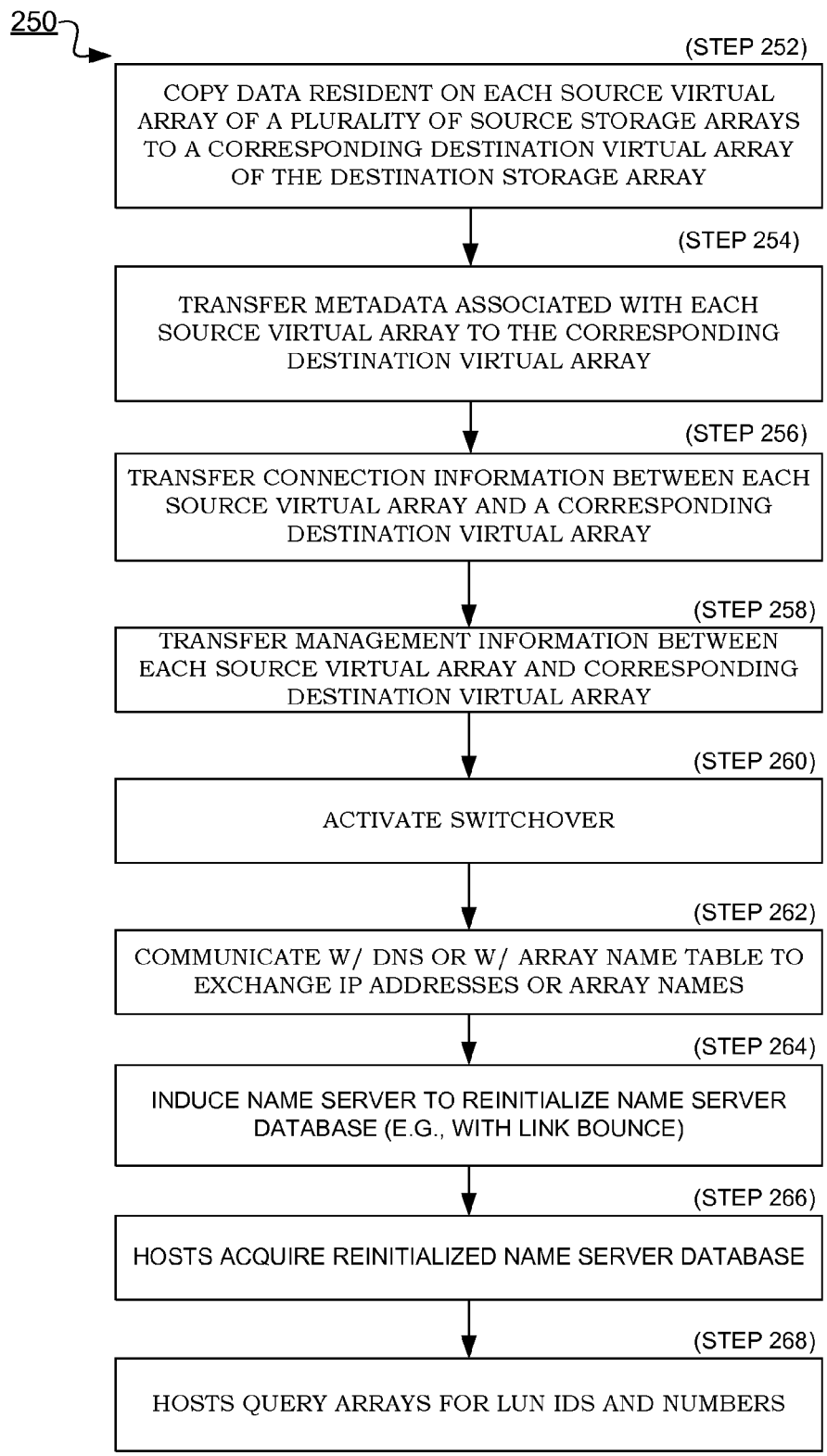
FIG. 21 is a flow diagram of an embodiment of process for consolidating data resident at multiple source storage arrays into a single destination storage array using virtual array migration.

FIG. 21 shows an embodiment of process 250 for consolidating data resident at the source storage arrays 16*a*, 16*b* into the single destination array 16*g*. The process 250 executes transparently to the hosts 12, 18 and host applications. In the description of the process 250, reference is also made to features shown in FIG. 20. Although described with respect to two source storage arrays, the principles of the partitioning process apply to more than two source storage arrays.

At step 252, the remote replication engine 126 executing at the first source array 16*a* copies data from each source virtual array 66*a*, 66*b*, 66*c* to a corresponding destination virtual array 66*f*, 66*g*, and 66*h* of the destination storage array 16*g*. In addition, the remote replication engine 126 executing at the second source array 16*b* copies data from each source virtual array 66*d*, 66*e* to a corresponding destination virtual array 66L, 66*m* of the destination storage array 16*g*. More specifically, data of the source virtual array 66*a* are copied to the destination virtual array 66*f*; data of source virtual array 66*b*, to the destination virtual array 66*g*; data of source virtual array 66*c*, to the destination virtual array 66*h*; data of source virtual array 66*d*, to the destination virtual array 66L; and data of source virtual array 66*e*, to the destination virtual array 66*m*.

In one embodiment, select metadata at the source arrays 16*a*, 16*b* are also migrated to the destination array 16*g*. Each metadata LUN is associated with one of the source virtual arrays 66*a*, 66*b*, 66*c*, 66*d*, and 66*e*. The remote replication engine 126 executing at each source array 16*a*, 16*b* determines whether to copy and forward (step 254) each metadata LUN associated with the source virtual arrays of the source array. For example, metadata LUNs that belong to the source virtual array 66*a* are copied to metadata LUNs that belong to the destination virtual array 66*f*, provided the attribute associated with each metadata LUN indicates that the metadata LUN is to be copied.

At step 256, each source virtual array 16*a*, 16*b* transfers its Fibre Channel connection information to the corresponding destination virtual array. The connection information sent to a particular destination virtual array corresponds with the LUNs that have been migrated to that destination virtual array. As representative examples, the virtual port name/virtual port ID pair of (vn0, v0) passes from the source virtual array 66*a* (of source array 16*a*) to the destination virtual array 66f, while the virtual port name/virtual port ID pair of (vn4, v4) passes from the source virtual array 66e (of source array b) to the destination virtual array 66m. Also, as a representative example, the LUN names and LUN numbers of the LUNs 60a belonging to the source virtual array 66a become associated with the LUNs of the destination virtual array 66f.

At step 258, each source virtual array transfers its associated management information (logical serial numbers, array names, and gatekeepers) to its corresponding destination virtual array. As representative examples, the source virtual array 66a sends its logical serial number, array name, and gatekeeper to the destination virtual array 66f, while the destination virtual array 66f sends its logical serial number, array name, and gatekeeper to the source virtual array 66a. An exchange of management information between the source virtual arrays and their corresponding destination virtual arrays, rather than a one-way transfer, may occur without departing from the principles of the invention.

After the copying of data and transfer of information are complete, switchover is activated (step 260). One of the source arrays 16a, 16b, destination array 16g, or an administrator control station can then communicate (step 262) with the DNS server 26 to swap the IP address of each pair of corresponding source and destination virtual arrays e.g., (66a with 66f), (66b with 66g), (66c with 66h), (66d with 66L), and (66e with 66m). Alternatively, the array names of each corresponding pair of source and destination virtual arrays are swapped in the array name table 24.

FIG. 22 shows the array name table 24 and DNS table 106 before the array consolidation, and FIG. 23 shows the array name table 24 and DNS table 106 after the appropriate pairs of array names are swapped within the array name table 24. In FIG. 23, the entries 100 for the source virtual arrays (SRC A VARRAY A, SRC A VARRAY B, SRC A VARRAY C, SRC B VARRAY D, and SRC B VARRAY E) have been removed from the tables 24, 106. These source virtual arrays can be removed because the destination virtual arrays (DEST VARRAY F, DEST VARRAY G, DEST VARRAY H, DEST VARRAY L, and DEST VARRAY M) have each, in effect, replaced one of the source virtual arrays as a result of the consolidation.

FIG. 24 shows an alternative to swapping array names: i.e., swapping appropriate pairs of IP addresses within the DNS table 106, as described above. Notably, the entries for the destination virtual arrays (DEST A VARRAY F, DEST A VARRAY G, DEST A VARRAY H, DEST B VARRAY L, and DEST B VARRAY M) have been removed from the tables 24, 106 in FIG. 24. These entries can be removed because the logical serial number and array name of each source virtual array (SRC A VARRAY A, SRC A VARRAY B, SRC A VARRAY C, SRC B VARRAY D, and SRC B VARRAY E) have become associated with a corresponding destination virtual array, and now operate to direct communications to that destination virtual array as described below.

Because the process of consolidation occurs transparently with respect to the management application 22 (FIG. 1) executing on the host 18, the management application 22 continues to run as though accessing data at each of the source virtual arrays. For example, the management application 22 can continue to issue messages directed to serial number "123456A0" (previously associated with the source virtual array 66a). Because of the exchange of array names of the source and destination virtual arrays 66a, 66f in the array name table 24, or of the exchange of IP addresses at the DNS server 26, the management messages are addressed to the IP address of the destination virtual array 66f after the switchover.

In this embodiment, the switch 14 contains the name server, which reinitializes (step 264) the name-server database 70. In another embodiment, the name server is separate from the switch 14. The updated name-server database is uploaded (step 266) to the registered devices, including hosts 12, 18. Subsequently, the hosts query (step 268) the destination virtual arrays using the LUN ID-numbers.

Aspects of the present invention may be implemented, in whole or in part, as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method of migrating data stored in logical units of storage (LUNs) at a plurality of source storage arrays into one destination storage array transparently with respect to a host in communication with the source storage arrays through a switch, the method comprising:

dividing a first physical source storage array into a plurality of source virtual arrays;

dividing a second different physical source storage array into a plurality of source virtual arrays;

dividing a destination physical storage array into a plurality of destination virtual arrays including a first destination virtual array and a second destination virtual array, wherein a virtual array comprises a plurality of LUNs;

copying, during a data migration event, data stored in a LUN of a first source virtual array of the first physical source storage array to a corresponding LUN of the first destination virtual array of the destination storage array;

copying, during the same data migration event, data stored in a LUN of a second source virtual array of the second physical source storage array to a corresponding LUN of the second destination virtual array of the destination storage array;

associating metadata with the first source virtual array of the first physical source storage array and metadata with the second source virtual array of the second physical storage array; and copying, during the data migration event, the metadata associated with the first source virtual array to the first destination virtual array of the destination physical storage array and the metadata associated with the second source virtual array to the second destination virtual array of the destination physical storage array.

2. The method of claim 1, further comprising the step of copying a plurality of LUNs of the first source virtual array to corresponding LUNs of the first destination virtual array of the destination storage array and a plurality of LUNs of the second source virtual array to corresponding LUNs of the second destination virtual array of the destination storage array.

3. The method of claim 1, further comprising the steps of:
transferring, during the data migration event, connection information associated with the first source virtual array from the first source storage array to the destination storage array where said connection information becomes associated with the first destination virtual array of the destination storage array; and
transferring connection information associated with the second source virtual array of the second source storage array to the destination storage array where said connection information becomes associated with the second destination virtual array of the destination storage array, wherein the connection information transferred to the destination storage array is used to route communications from the host to the first and second destination virtual arrays of the destination storage array to access the data copied thereto.

4. The method of claim 1, further comprising the steps of:
associating metadata with the first source virtual array of the first source storage array, the metadata being used by a storage application executing on the host to provide particular storage functionality at the first source storage array; and
copying, during the data migration event, the metadata associated with the first source virtual array to the first destination virtual array.

5. The method of claim 1, further comprising the steps of:
transferring management information associated with the first source virtual array from the first source storage array to the destination storage array where said management information becomes associated with the first destination virtual array of the destination storage array; and
transferring management information associated with the second source virtual array from the second source storage array to the destination storage array where said management information becomes associated with the second destination virtual array of the destination storage array.

6. The method of claim 5, further comprising the step of assigning a unique logical serial number to the first source virtual array of the first source storage array and to the second source virtual array of the second source storage array, and
wherein the steps of transferring management information include transferring the logical serial number assigned to each source storage array to the destination storage array during the data migration event so that the logical serial number of the first source virtual array becomes associated with the first destination virtual array of the destination storage array and the logical serial number of the second source virtual array becomes associated with the second destination virtual array of the destination storage array.

7. The method of claim 5, further comprising the step of assigning an array name to each source virtual array, and
wherein the steps of transferring management information include transferring the array name assigned to the first source virtual array to the first destination virtual array of the destination storage array and transferring the array name assigned to the second source virtual array to the second destination virtual array of the destination storage array.

8. The method of claim 7, wherein the steps of transferring the array names from the source virtual arrays to the destination virtual arrays include:
exchanging the array name of the first source virtual array with an array name of the first destination virtual array in an array name table; and
exchanging the array name of the second source virtual array with the array name of the second destination virtual array in the array name table.

9. The method of claim 5, further comprising the step of generating a gatekeeper for each source virtual array, and
wherein the steps of transferring management information include transferring the gatekeeper generated for the first source virtual array to the first destination virtual array of the destination storage array and transferring the gatekeeper generated for the second source virtual array to the second destination virtual array of the destination storage array.

10. The method of claim 5, further comprising the step of assigning a unique network address to each source virtual array by which messages may be directed to that source virtual array over a network, and wherein the steps of transferring management information include transferring the network address assigned to first source virtual array to the first destination virtual array of the destination storage array and transferring the network address assigned to second source virtual array to the second destination virtual array of the destination storage array.

11. The method of claim 10, wherein the steps of transferring the network addresses from the source virtual arrays to the destination virtual arrays include:
exchanging the network address of the first source virtual array with a network address of the first destination virtual array at a Domain Name System (DNS) server; and
exchanging the network address of the second source virtual array with a network address of the second destination virtual array at the DNS server.

12. A storage network comprising:
a switch;
a destination physical storage array coupled to the switch, the destination storage array being partitioned into a plurality of destination virtual arrays including a first destination virtual array and a second destination virtual array, wherein a virtual array comprises a plurality of logical units of storage (LUNs);
a first physical source storage array coupled to the switch, the first physical source storage array being divided into at least one source virtual array including a first source virtual array, the first source virtual array having a LUN for storing data, the first physical source storage array having a replication engine that copies the data stored on the LUN of the first source virtual array to a corresponding LUN of the first destination virtual array during a data migration event;
a second, different physical source storage array coupled to the switch, the second physical source storage array being divided into at least one source virtual array including a second source virtual array, the second source virtual array having a LUN for storing data, the second source storage array having a replication engine that copies the data stored on the LUN of the second source virtual array to a corresponding LUN of the second destination virtual array during the same data migration event,
wherein each physical source storage array includes memory storing metadata, the metadata stored at the first physical source storage array being associated with the first source virtual array and the metadata stored in memory at the second physical storage array being associated with the second source virtual array, and wherein, during the data migration event, the replication engine of the first physical source storage array copies the metadata associated with the first source virtual array to the destination physical storage array where said metadata becomes associated with the first destination virtual array and the replication engine of the second physical source storage array copies the metadata associated with the second source virtual array to the destination physical storage array where the metadata becomes associated with the second destination virtual array.

13. The storage network of claim 12, wherein the first source storage array has a controller that transfers, during the data migration event, connection information associated with the first source virtual array to the first destination virtual array, and the second source storage array has a controller that transfers, during the data migration event, connection information associated with the second source virtual array to the second destination virtual array, the connection information transferred to each destination virtual array being used by a host coupled to the switch to access the data copied to that destination virtual array.

14. The storage network of claim 12, wherein the first source storage array has a controller that, during the data migration event, transfers management information associated with the first source virtual array to the destination storage array where said management information becomes associated with the first destination virtual array, and the second source storage array has a controller that transfers management information associated with the second source virtual array to the destination storage array where said management information becomes associated with the second destination virtual array.

15. The storage network of claim 14, wherein the management information transferred to the first destination virtual array includes a unique logical serial number assigned to the first source virtual array and the management information transferred to the second destination virtual array includes a unique logical serial number assigned to the second source virtual array.

16. The storage network of claim 14, wherein the management information transferred to the first destination virtual array includes a unique network address assigned to the first source virtual array and the management information transferred to the second destination virtual array includes a unique network address assigned to the second source virtual array.

17. The storage network of claim 14, wherein the management information transferred to the first destination virtual array includes a gatekeeper generated for the first source virtual array, and the management information transferred to the second destination virtual array includes a gatekeeper generated for the second source virtual array.

18. The storage network of claim 14, wherein the management information transferred to the first destination virtual array includes an array name assigned to the first source virtual array, and the management information transferred to the second destination virtual array includes an array name assigned to the second source virtual array.

19. A method of migrating data stored in logical units of storage (LUNs) at a plurality of source storage arrays into one destination storage array transparently with respect to a host in communication with the source storage arrays through a switch, the method comprising:

dividing a first physical source storage array into a plurality of source virtual arrays;

dividing a second, different physical source storage array into a plurality of source virtual arrays;

dividing a physical destination storage array into a plurality of destination virtual arrays including a first destination virtual array and a second destination virtual array, wherein a virtual array comprises a plurality of LUNs;

copying, during a data migration event, data stored in a LUN of a first source virtual array of the first physical source storage array to a corresponding LUN of the first destination virtual array of the destination storage array and data stored in a LUN of a second source virtual array of the second physical source storage array to a corresponding LUN of the second destination virtual array of the destination storage array;

transferring, during the data migration event, connection information, management information, and metadata associated with the first source virtual array from the first physical source storage array to the destination storage array where said connection information, management information, and metadata become associated with the first destination virtual array of the destination storage array; and transferring, during the data migration event, connection information, management information, and metadata associated with the second source virtual array of the second physical source storage array to the destination storage array where said connection information, management information, and metadata become associated with the second destination virtual array of the destination storage array.

* * * * *